United States Patent
Han et al.

(10) Patent No.: US 8,929,194 B2
(45) Date of Patent: *Jan. 6, 2015

(54) SEQUENCE GENERATION AND TRANSMISSION METHOD BASED ON TIME AND FREQUENCY DOMAIN TRANSMISSION UNIT

(75) Inventors: Seung Hee Han, Anyang-si (KR); Min Seok Noh, Anyang-si (KR); Yeong Hyeon Kwon, Anyang-si (KR); Hyun Woo Lee, Anyang-si (KR); Dong Cheol Kim, Anyang-si (KR); Jin Sam Kwak, Anyang-si (KR)

(73) Assignee: LG Electronics Inc., Seoul (KR)

( * ) Notice: Subject to any disclaimer, the term of this patent is extended or adjusted under 35 U.S.C. 154(b) by 363 days.

This patent is subject to a terminal disclaimer.

(21) Appl. No.: 13/538,906

(22) Filed: Jun. 29, 2012

(65) Prior Publication Data

US 2013/0003675 A1 Jan. 3, 2013

Related U.S. Application Data

(63) Continuation of application No. 12/520,108, filed as application No. PCT/KR2007/006733 on Dec. 21, 2007, now Pat. No. 8,228,782.

(60) Provisional application No. 60/871,604, filed on Dec. 22, 2006, provisional application No. 60/886,621, filed on Jan. 25, 2007, provisional application No. 60/912,109, filed on Apr. 16, 2007.

(30) Foreign Application Priority Data

| Apr. 3, 2007 | (KR) | 10-2007-0032725 |
| Apr. 13, 2007 | (KR) | 10-2007-0036460 |
| Jun. 26, 2007 | (KR) | 10-2007-0062893 |

(51) Int. Cl.
*H04J 9/00* (2006.01)
*H04L 27/26* (2006.01)
*H04L 5/02* (2006.01)

(52) U.S. Cl.
CPC .............. *H04L 5/023* (2013.01); *H04L 27/261* (2013.01); *H04L 27/2614* (2013.01)
USPC ........... 370/204; 370/478; 332/119; 375/132; 455/102

(58) Field of Classification Search
None
See application file for complete search history.

(56) References Cited

U.S. PATENT DOCUMENTS

| 5,533,004 A | 7/1996 | Jasper et al. |
| 5,956,328 A | 9/1999 | Sato |

(Continued)

FOREIGN PATENT DOCUMENTS

| EP | 1 124 348 A2 | 8/2001 |
| EP | 1 404 079 A2 | 3/2004 |

(Continued)

OTHER PUBLICATIONS

Lucent Technologies, "Multiplexing Method for Uplink Non-Data-Associated Control Signals", 3GPP TSG-RAN WG1 #47, R1-063483, pp. 1-6, Nov. 6-10, 2006.

(Continued)

*Primary Examiner* — Jeffrey M Rutkowski
(74) *Attorney, Agent, or Firm* — Birch, Stewart, Kolasch & Birch, LLP

(57) ABSTRACT

A method for generating/transmitting a transmission-unit symbol sequence is disclosed. In the case of transmission information, the information is modulated in time and frequency domains on the basis of a predetermined transmission unit (e.g., a transmission time interval TTI or slot), simultaneous transmission of the information is made, and then a transmission unit symbol is generated/transmitted. A transmission sequence is masked in each symbol contained in one transmission unit. Symbol-unit circular shift (cyclic shift) is applied to the masked result, so that transmission efficiency increases. A control signal transmission method for supporting a variety of formats and a signal transmission method based on a prime-length sequence are also provided.

16 Claims, 28 Drawing Sheets

(56) References Cited

U.S. PATENT DOCUMENTS

| | | |
|---|---|---|
| 5,966,377 A | 10/1999 | Murai |
| 6,944,120 B2 | 9/2005 | Wu et al. |
| 7,660,229 B2 | 2/2010 | Papasakellariou et al. |
| 2002/0044524 A1 | 4/2002 | Larola et al. |
| 2006/0072649 A1 | 4/2006 | Chang et al. |
| 2007/0041311 A1 | 2/2007 | Baum et al. |
| 2007/0189151 A1 | 8/2007 | Pan et al. |
| 2007/0211619 A1 | 9/2007 | Jalloul et al. |

FOREIGN PATENT DOCUMENTS

| | | |
|---|---|---|
| EP | 1 524 813 A2 | 4/2005 |
| KR | 10-2004-0029253 A | 4/2004 |
| WO | 2007/126280 A2 | 11/2007 |

OTHER PUBLICATIONS

Myung et al., "Single Carrier FDMA for Uplink Wireless Transmission", IEEE Vehicular Technology Magazine, vol. 1, pp. 30-38, Sep. 2006.

Qualcomm Europe, "Structure and Link Analysis UL Control Signaling", 3GPP TSG-RAN WG1 #47, R1-063448, pp. 1-10, Nov. 6-10, 2006.

Control format specific spreading layer

SEQUENCE GENERATION AND TRANSMISSION METHOD BASED ON TIME AND FREQUENCY DOMAIN TRANSMISSION UNIT

CROSS-REFERENCE TO RELATED APPLICATIONS

This application is continuation of U.S. application Ser. No. 12/520,108 filed on Jun. 19, 2009 now U.S. Pat. No.8, 228,782, which is the National Phase of PCT/KR2007/006733 filed on Dec. 21, 2007, which claims priority under 35 U.S.C. 119(e) to U.S. Provisional Application No. 60/871, 604 filed on Dec. 22, 2006, U.S. Provisional Application No. 60/886,621 filed on Jan. 25, 2007, and U.S. Provisional Application No. 60/912,109 filed on Apr. 16, 2007, and under 35 U.S.C. 119(a) to Korean Application No. 10-2007-0032725 filed on Apr. 3, 2007, Korean Application No. 10-2007-0036460 filed on Apr. 13, 2007, and Korean Application No. 10-2007-0062893 filed on Jun. 26, 2007, all of which are hereby expressly incorporated by reference into the present application.

TECHNICAL FIELD

The present invention relates to a method for transmitting/receiving a signal for use in a mobile communication system, and more particularly to a method for generating/transmitting a sequence based on a time-frequency domain transmission unit.

BACKGROUND ART

The present invention relates to a method for modulating a predetermined transmission sequence in time and frequency directions at intervals of a transmission unit, generating a symbol acquired by the modulation of the predetermined transmission sequence, and transmitting the symbol at intervals of a transmission unit.

In a Universal Mobile Telecommunications System (UMTS) communication system based on the 3rd Generation Partnership Project Long Term Evolution (3GPP LTE) scheme, a transmission end defines a Transmission Time Interval (TTI) used as a time unit capable of simultaneously transmitting at least one transmission block (i.e., upper layer transmission information). In the case of small-sized packet data such as VoIP, a slot contained in a single TTI (i.e., 1 TTI) is defined as a unit for simultaneously transmitting corresponding information. A plurality of OFDM symbols may be contained in the above-mentioned TTI in a time direction, the 3GPP LTE assumes that 14 OFDM symbols are contained in the 1 TTI and two slots are contained in the 1 TTI. This TTI definition is changed according to system categories. The present invention aims to define a format for transmitting a packet or control signal when a predetermined transmission unit is defined in a general wireless communication system.

In the meantime, the transmission unit may be adjusted in OFDM-length units on a time axis. In the case of establishing a transmission unit reference, a coverage and energy efficiency are considered. For example, a Single-Carrier Frequency Division Multiplexing (SC-FDM) scheme used as an uplink transmission scheme associated with a control signal for use in the 3GPP LTE scheme will hereinafter be described.

The most important duty of a User Equipment (UE) or terminal transferring a control signal to a Node-B is the coverage. In other words, although a bandwidth of a transmission (Tx) signal of the user equipment (UE) is not relatively large, the power must be concentrated on a single place and be transmitted to this place, and it is preferable that a variable width (PAPR) of the transmission signal may be narrow. For these purposes, the 3GPP LTE has prescribed that the SC-FDM scheme is basically used as an uplink signal transmission scheme.

FIG. 1 is a block diagram illustrating a transmission end of a conventional communication system based on the SC-FDM scheme.

The SC-FDM scheme is a transmission scheme for improving PAPR characteristics by reducing the amount of change in a signal. In the case of using the same power amplifier, a wider coverage can be implemented. As can be seen from the transmission end based on the SC-FDM scheme of FIG. 1, the most important characteristic of the SC-FDM scheme is that a transmission (Tx) signal is firstly spread out by a DFT module 101 according to the DFT scheme. This spread signal is mapped to the transmission (Tx) signal based on the OFDM symbol unit by an IFFT module 102 serving as an IDFT module.

Therefore, the transmission (Tx) signal is concentrated on a transmission frequency band, and is then transmitted to a destination. The resultant signal has the same effect as in the case in which the transmission (Tx) signal is transmitted via a single-carrier.

In the meantime, the transmission signal proposed by the 3GPP LTE scheme employing the SC-FDM scheme basically transmits information using a single OFDM symbol unit.

However, a transmission unit capable of actually transmitting a predetermined amount of information at once is a TTI or slot, so that it is preferable that the transmission (Tx) signal is constructed on the basis of the TTI or slot. A control signal proposed by the 3GPP LTE does not clearly provide a method for supporting a multi-format or acquiring various spreading gains, or a method for increasing the number of user equipments (UEs).

Specifically, in the case where the same user transmits different amounts of control signals, a control channel structure capable of easily supporting the above-mentioned control signals is required. However, no solution capable of implementing the control channel structure has been proposed.

The present invention provides an improved channel structure for transmitting a control signal. This improved channel structure can be applied to uplink/downlink channels based on a predetermined communication scheme capable of transmitting a signal via a predetermined sequence, and has no problem in a multi-cell deployment.

The present invention provides a method for guaranteeing a maximum number of sequences which can be applied to a corresponding channel via a channel structure, and transmitting/receiving a signal using the guaranteed sequences.

For these purposes, in the case of designing a control signal for use in a predetermined communication system, the present invention must consider a method for generating/transmitting a control signal using a user equipment (UE).

Provided that neighboring cells use the same sequence or the same uplink resources in a multi-cell environment, an unexpected collision may occur between the neighboring cells.

In order to discriminate between the neighboring cells, the neighboring cells may use different resources according to a predetermined rule prescribed between them. However, this method may have difficulty in a cell planning of an actual system deployment stage.

In the meantime, for example, the above-mentioned communication system may consider a method for implementing a randomization effect according to a frequency hopping- or sequence hopping-scheme. In this case, the above-mentioned randomization effect method accommodates interference between different cells without any change, so that it is disadvantageous to the system.

Therefore, the best solution for solving the above-mentioned problems is to differently use different user equipments (UEs) according to the CDM scheme using different orthogonal sequences or other sequences similar to the orthogonal sequences.

The above-mentioned solution has no need to perform the cell planning, and allows different systems to share the same resources with minimum costs. A proper number of spread sequences are required for the above-mentioned solution. However, in fact, the conventional art does not provide a method for employing a sufficient number of sequences without deteriorating a sequence performance.

DISCLOSURE

Technical Problem

Accordingly, the present invention is directed to a sequence generation and transmission method based on time/frequency domain transmission unit that substantially obviates one or more problems due to limitations and disadvantages of the related art.

An object of the present invention is to provide a method for modulating transmission information in TTI or slot units instead of symbol units, generating a corresponding transmission unit symbol using the modulated information, and transmitting a signal using the generated transmission unit symbol. The above-mentioned method can be applied to a control channel for transmitting a control signal to an uplink.

Another object of the present invention is to provide a method for simultaneously transmitting a uniformity (PAPR/CM) of a transmission (Tx) signal, a cell coverage, and much more information.

Yet another object of the present invention is to provide a transmission signal generation method for supporting a multi-format or acquiring a variety of spreading gains.

Yet another object of the present invention is to provide a method for minimizing an interference between UE signals while simultaneously increasing the number of UEs, and allowing a user to transmit various amounts of signals.

Yet another object of the present invention is to provide a channel structure for guaranteeing a maximum number of available sequences, and transmitting/receiving a signal using the channel structure.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Technical Solution

To achieve these objects and other advantages and in accordance with the purpose of the invention, as embodied and broadly described herein, a method for modulating a predetermined transmission sequence in time and frequency directions within transmission units of time/frequency domain in a communication system, and generating a transmission-unit-based symbol is presented. In one embodiment of this method, the method comprises: modulating the predetermined transmission sequence in a first direction corresponding to either one of the time and frequency directions in transmission units of a time- or frequency-domain corresponding to the first direction, and generating a first-direction modulation sequence; and modulating the first-direction modulation sequence in a second direction corresponding to the other one of the time and frequency directions in transmission units of the time- or frequency domain corresponding to the second direction, and generating the transmission-unit-based symbol.

Preferably, the time-domain transmission unit is either a transmission time interval (TTI) or a slot contained in the transmission time interval (TTI).

Preferably, the first-direction modulation and the second-direction modulation indicate either a spreading or a scrambling of the predetermined sequence.

Preferably, the first direction-direction modulation is performed such that the predetermined transmission sequence is multiplied by a time-direction modulation sequence having a predetermined length of the time-domain transmission unit; and the second direction-direction modulation is performed such that each symbol of the first-direction modulation sequence is multiplied by a frequency-direction modulation sequence having a predetermined length corresponding to the number of sub-carriers contained in a single resource block.

Preferably, the first-direction modulation is performed such that the predetermined transmission sequence is multiplied by a frequency-direction modulation sequence having a predetermined length corresponding to the number of sub-carriers contained in a single resource block; and the second direction-direction modulation is performed when the first-direction modulation sequence for each symbol of the time-domain transmission unit is multiplied by a time-direction modulation sequence having a predetermined length of the time-domain transmission unit.

Preferably, the method further comprising: performing a frequency hopping on each predetermined symbol contained in the time-domain transmission unit at the transmission-unit-based symbol.

Preferably, the communication system is a single-carrier frequency division multiplexing (SC-FDM)-based communication system, and the predetermined transmission sequence is a sequence in which heterogeneous control information is mixed by a Discrete Fourier Transform (DFT) spreading.

In another aspect of the present invention, there is provided a method for transmitting a control signal in a communication system which allocates a predetermined number of sub-carrier areas for a control channel. In one embodiment for this aspect, the method comprises: a) masking a symbol unit based predetermined sequence in each symbol contained in a time-domain transmission unit, in the predetermined number of sub-carrier areas allocated for the control channel; and b) transmitting the symbol-masked sequence per the time-domain transmission units.

Preferably, the predetermined number of sub-carrier areas allocated for the control channel are located at one or both ends of a system bandwidth.

Preferably, the predetermined number of sub-carrier areas allocated for the control channel are allocated to the same frequency band within a cell of a neighboring group.

Preferably, the predetermined number of sub-carrier areas allocated for the control channel is distributedly arranged in a system bandwidth.

Preferably, the masking step a) includes: applying a symbol-unit based cyclic shift to the symbol-unit based sequence, and performing a masking thereon.

Preferably, the symbol-unit based sequence is generated by a first process and a second process, the first process is modulating a predetermined input sequence in a first direction corresponding to either of time and frequency directions within transmission units of a time- or frequency-domain corresponding to the first direction, and generates a first-direction modulation sequence, and the second process is modulating the first-direction modulation sequence in a second direction corresponding to the other one of the time and frequency directions in transmission units of a time- or frequency-domain corresponding to the second direction.

Preferably, at least one of an index of the symbol-masked sequence and a symbol-unit based cyclic shift applied to the symbol-masked sequence is indicative of control information.

Preferably, the method further comprising: c) inserting a pilot into a predetermined number of symbols, the predetermined number of symbols corresponds to a number of difference between the number of symbols contained in the time domain transmission unit and a prime number less than the number of the symbols contained in the time domain transmission unit.

Preferably, the inserting step c) includes: inserting pilots, into the center part of a domain to be channel-estimated such that the inserted pilots are equally spaced apart from each other.

Preferably, a first area contained in the time-domain transmission unit supports a coherent searching scheme; and a second area contained in the time-domain transmission unit supports a non-coherent scheme, and wherein, in the first area, at least one of an index of a sequence masked in a symbol contained in the first area, and a symbol-unit based cyclic shift applied to the sequence masked in the symbol contained in the first area is indicative of control information, and in the second area, symbol information of a sequence masked in a symbol contained in the second area is indicative of control information.

Preferably, the sequence masked in each symbol contained in the time-domain transmission unit is indicative of control information capable of being searched by a coherent searching process, and a pilot transmission symbol contained in the time domain transmission unit transmitting the control information is arranged at the same position as that of a pilot transmission symbol of a data transmission channel.

Preferably, the sequence masked in each symbol contained in the time-domain transmission unit is indicative of control information capable of being searched by a coherent searching process, in which the control information is represented by the combination of a sequence for use in the first-direction modulation of the input sequence and the other sequence for use in the second-direction modulation of the input sequence.

Preferably, the sequence masked in each symbol contained in the time-domain transmission unit is indicative of control information capable of being searched by a non-coherent searching process, in which the control information is represented by a differential modulation in either the time domain or the frequency domain of the sequence masked in each symbol.

In yet another aspect of the present invention, there is provided a signal generation method comprising: a) spreading an information symbol in a first domain corresponding to either a frequency domain or a time domain in symbol units; b) modulating the symbol-unit-spread information symbol in the first domain, and generating a first-domain modulation symbol; and c) modulating the first-domain modulation symbol in a second domain corresponding to the other one of the time and frequency domains, and generating a transmission signal.

Preferably, at the spreading step a), a symbol-unit spreading gain of the information symbol is proportional to a Quality of Service (QoS) level required for the information symbol.

Preferably, the generating step b) for generating the first-domain modulation symbol includes: multiplexing the symbol-unit-spread information symbol; and modulating the multiplexed information symbol in the first domain, and the generating step c) for generating the transmission signal includes: multiplexing the second-domain modulation sequence in the second domain; and performing the second-domain modulation on the first-domain modulation symbol using the multiplexed second-domain modulation sequence.

Preferably, the method further comprises: if the size of a channel for transmitting the transmission signal is fixed, applying at least one of a channel coding, a spreading, and a rate-matching to either control signals of different sizes or data of different sizes, such that the information symbol has a predetermined size.

Preferably, the information symbol is generated by a control-channel specific spreading to remove an interference between signals of different user equipments (UEs), and is then generated.

In yet another aspect of the present invention, there is provided a signal transmission method comprising: dividing sub-carriers contained in a predetermined number of resource blocks (RBs) into a predetermined number of channels such that each of the channels includes a prime number of sub-carriers; and transmitting a signal over the divided channels.

Preferably, the signal transmitted over the predetermined number of channels is represented by a predetermined sequence, and wherein the predetermined sequence is a sequence among which a number of distinctive sequence is maximized, if the predetermined sequence has a prime-number length.

Preferably, the predetermined sequence is a Constant Amplitude Zero Auto Correlation (CAZAC) sequence.

It is to be understood that both the foregoing general description and the following detailed description of the present invention are exemplary and explanatory and are intended to provide further explanation of the invention as claimed.

Advantageous Effects

A method for generating/transmitting a sequence based on a time/frequency domain transmission unit according to one embodiment of the present invention performs time/frequency direction modulation in predetermined transmission units (e.g., TTIs or slots) instead of symbol units, generates a symbol according to the modulated result, and transmits the generated symbol, so that it can transmit much more information to a desired destination.

Also, the present invention performs masking of a transmission sequence on a time domain, and transmits the masking-resultant sequence. As a result, a CAZAC sequence is able to apply a symbol-unit cyclic shift to the time domain, so that much more information can be transmitted to a desired destination.

As described above, the present invention controls the symbol-unit cyclic shift of the time domain to indicate different control information, so that it can support a non-coherent searching process. In the case of using a method for supporting a coherent searching process, the present invention properly adjusts symbols associated with a pilot to guarantee an available number of sequences, and can greatly improve a channel estimation performance.

The present invention applies the above-mentioned method to a control channel capable of transmitting only a control signal excepting data, so that it does not affect signal uniformity and can effectively transmit control information.

In the meantime, a method for generating/transmitting a multi-format supporting sequence according to another embodiment of the present invention can generate a transmission (Tx) signal to which a variety of format signals can be applied, can effectively reduce an inter-cell interference between users (i.e., UEs), and can generate a transmission signal for satisfying different service quality levels.

The present invention provides a transmission method based on a sequence of a prime-number length. In the case of transmitting a control signal without using data in an uplink SC-FDM-based communication system, the above-mentioned transmission method can guarantee a maximum number of available sequences, and at the same time can transmit/receive a signal without deteriorating unique characteristics of the sequences.

In other words, in order to perform the multi-cell operation, a maximum number of sequences must be provided. For these purposes, the present invention provides a method for generating a channel (i.e., a control channel) having a prime-number length, and transmitting/receiving a signal using a sequence having the prime-number length.

DESCRIPTION OF DRAWINGS

The accompanying drawings, which are included to provide a further understanding of the invention, illustrate embodiments of the invention and together with the description serve to explain the principle of the invention.

In the drawings.

DETAILED DESCRIPTION

Reference will now be made in detail to the preferred embodiments of the present invention, examples of which are illustrated in the accompanying drawings. Wherever possible, the same reference numbers will be used throughout the drawings to refer to the same or like parts.

Prior to describing the present invention, it should be noted that most terms disclosed in the present invention correspond to general terms well known in the art, but some terms have been selected by the applicant as necessary and will hereinafter be disclosed in the following description of the present invention. Therefore, it is preferable that the terms defined by the applicant be understood on the basis of their meanings in the present invention.

For the convenience of description and better understanding of the present invention, general structures and devices well known in the art will be omitted or be denoted by a block diagram or a flow chart. Wherever possible, the same reference numbers will be used throughout the drawings to refer to the same or like parts.

As described above, one embodiment of the present invention provides a method for modulating transmission information in TTI or slot units instead of symbol units, generating a corresponding transmission unit symbol using the modulated information, and transmitting a signal using the generated transmission unit symbol.

Firstly, a basic embodiment provides a method for generating a transmission unit symbol, and a detailed description thereof will hereinafter be described.

In the case of generating a transmission signal in TTI or slot units, instead of OFDM symbol units, the present invention modulates the transmission signal not only in a time direction within a single transmission unit including several OFDM symbols, but also in a frequency direction concerning the generated symbols, so that the transmission signal may include additional information.

Figure 2:
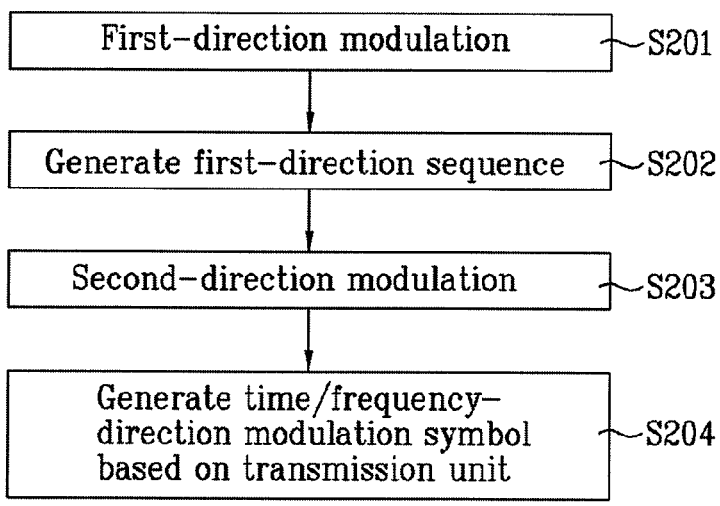
FIG. 2 is a flow chart illustrating a method for generating a transmission unit symbol according to one embodiment of the present invention.

FIG. 2 is a flow chart illustrating a method for generating a transmission unit symbol according to one embodiment of the present invention.

Referring to FIG. 2, a predetermined sequence indicating a transmission signal is modulated in either a time direction or a frequency direction at step S201. For the convenience of description and better understanding of the present invention, the selected direction is called a first direction.

If the above-mentioned first-direction modulation is a time-domain modulation, the sequence indicating the transmission signal is multiplied by a time-direction modulation sequence having the length of an OFDM symbol contained in a transmission unit (e.g., 1 TTI or 1 slot) of a corresponding system, so that the sequence modulation in the time domain is implemented.

If the above-mentioned first-direction modulation is a frequency-domain modulation, the sequence indicating the transmission signal is multiplied by a frequency-direction modulation sequence having a predetermined length corresponding to the number of sub-carriers required for transmitting conventional single unit information, so that the sequence modulation in the frequency domain is implemented.

In this case, the time-direction modulation indicates that a predetermined transmission sequence is spread or scrambled in the time direction. The frequency-direction modulation indicates that a predetermined transmission sequence is spread or scrambled in the frequency direction.

If a transmission sequence is a CAZAC sequence, the first-direction modulation sequence may be an exponential-function sequence for applying a cyclic shift to the transmission sequence in the same or different domains. The first-direction modulation sequence may also be a predetermined modulation sequence.

Therefore, a first-direction sequence is generated at step S202. In other words, the first-direction sequence indicates that the transmission sequence is modulated in either the time direction or the frequency direction.

Thereafter, the first-direction sequence generated at step S202 is modulated in the other direction, instead of the above-mentioned first direction, from among the time and frequency directions. For the convenience of description and better understanding of the present invention, the selected direction is called a second direction.

In the case of the second-direction modulation, if the first-direction sequence generated at step S202 is multiplied by a second-direction modulation sequence, the second-direction modulation can be implemented in the same manner as in the above-mentioned second-direction modulation.

In this case, the second-direction modulation sequence has the length of an OFDM symbol contained in a time domain within the 1 TTI or 1 slot, or has a predetermined length corresponding to the number of sub-carriers required for transmitting conventional single unit information.

Therefore, the time/frequency-direction modulation symbol based on units of a transmission time (e.g., TTI or slot) is generated at step S204. So, the present invention can transmit not only information of a transmission sequence but also additional information in a modulation step for each domain.

For example, if the CAZAC sequence is used as a transmission sequence, two sequences based on different cyclic shifts are allocated to individual user equipments (UEs), so that the individual UEs can indicate ACK/NACK information.

In this case, different cyclic shifts may be directly applied to a process for transmitting the transmission sequence. However, in the case of using the transmission unit symbol of the present invention, the different cyclic shifts may also be applied to a method for performing a time-domain modulation or a frequency-domain modulation on a transmission sequence.

In association with FIG. 2, the term "transmission unit" may include all of time units (e.g., TTIs and slots), each of which can simultaneously transmit transmission information.

For the convenience of description and better understanding of the present invention, it is assumed that the above-mentioned transmission unit is set to the TTI in the present invention. However, it should be noted that the scope of the transmission unit is not limited to the TTI, and can also be applied to other examples as necessary.

In the meantime, the above-mentioned scheme of FIG. 2 can be applied to a control channel for transmitting a control signal to an uplink based on the SC-FDM scheme, so that the present invention can transmit uniformity of a transmission signal, a cell coverage, and more control information at the same time. In association with the above-mentioned description, a channel structure used for transmitting a control signal using the SC-FDM scheme will hereinafter be described in detail.

In the case of transmitting the control signal using the SC-FDM scheme, the following factors must be considered.

Firstly, the present invention must determine the presence or absence of data in the transmitted control signal, so that it may use different channel structures according to the presence or absence of data in the transmitted control signal.

Figure 3:
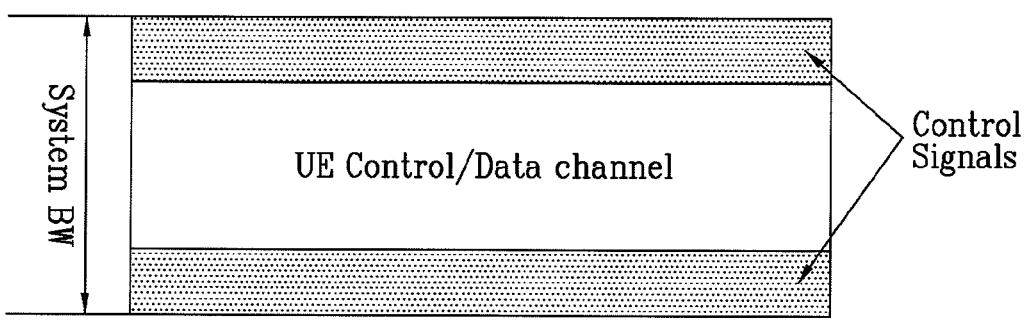
FIG. 3 is a structural diagram illustrating a channel structure for use in a specific case in which only a control signal excepting data is transmitted.

FIG. 3 is a structural diagram illustrating a channel structure for use in a specific case in which only a control signal excepting data is transmitted.

The exemplary case of FIG. 3 shows that the control signal has no data to be transmitted. As can be seen from FIG. 3, some areas of a system bandwidth are classified according to a frequency division multiplexing (FDM) scheme, and a control signal is allocated to the divided areas. Specifically, a control-channel area allocated for transmission of the control signal without transmitting data may be located at both ends of the system bandwidth as shown in FIG. 3.

A user equipment (UE) capable of transmitting only the control signal using the above-mentioned control channel may demodulate the control signal in the allocated area according to the SC_FDM scheme, and may transmit the demodulated control signal to the allocated area. According to a scheme for transmitting the control signal in the above-mentioned allocated area, a FDM or code division multiplexing (CDM) scheme may be applied to UE control signals within the allocated area.

Figure 4:
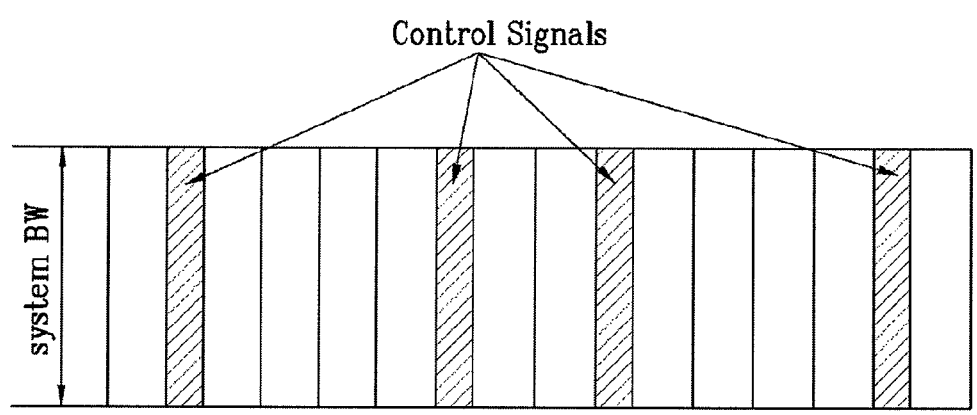
FIG. 4 is a structural diagram illustrating a channel structure for use in a specific case in which data and a control signal are simultaneously transmitted.

FIG. 4 is a structural diagram illustrating a channel structure for use in a specific case in which data and a control signal are simultaneously transmitted.

If the data and the control signal are simultaneously transmitted, some areas of the system bandwidth are classified according to the FDM scheme, and may then be allocated to transmit a control channel. In this case, the transmission scheme is not considered to be the SC-FDM scheme, and corresponds to a multi-carrier transmission scheme. Therefore, in the case of simultaneously transmitting the data and the control signal, the present invention transmits both the data and the control signal using the DFT spreading scheme, so that the SC-FDM scheme is maintained and the PAPR of the transmission signal is reduced. In this case, a method for adding the data and the control signal may be a time division multiplexing (TDM), CDM, or modulation-based transmission scheme. FIG. 4 shows that the control signal and the data are transmitted according to the TDM scheme.

If there is no control signal in the structure of FIG. 4, a method for increasing a coverage can be implemented. If there is a need to strongly transmit a control signal, a specific control signal is repeatedly inserted into each OFDM symbol, so that the power of the control signal can be increased by about 10*log 10(12)=10.8 dB.

In association with the above-mentioned control channel structure, the following description relates to a specific case in which the TTI-unit symbol modulated in time and frequency directions is applied to a control channel for transmitting only the control signal and excluding other data. In other words, the following description relates to a control signal transmission structure capable of transmitting more control information without affecting the PAPR/CM of a control signal in the basic control channel structure shown in FIG. 3.

However, a method for generating the TTI-unit symbol and transmitting a signal according to each embodiment of the present is not limited to only the above-mentioned transmission of the control signal, and can also be applied to a predetermined system which uses a TTI as a transmission unit.

In the case of implementing the above-mentioned embodiment using a channel capable of transmitting only the control signal and excluding other data, a CAZAC sequence can be generally used as a sequence for transmitting the control signal. In more detail, a Zadoff-Chu (ZC) CAZAC sequence can be used as the sequence for transmitting the control signal.

The above-mentioned CAZAC sequence will hereinafter be described.

The CAZAC sequence is generally classified into the Zadoff-Chu (ZC) CAZAC sequence and a GCL CAZAC sequence. The relationship between the Zadoff-Chu (ZC) CAZAC sequence and the GCL CAZAC sequence is represented by a conjugate complex number. In more detail, the GCL CAZAC sequence can be acquired by a conjugate complex number of the Zadoff-Chu (ZC) CAZAC sequence.

The Zadoff-Chu (ZC) CAZAC sequence can be represented by the following equations 1 and 2:

$$c(k; N, M) = \exp\left(\frac{j\pi Mk(k+1)}{N}\right) \quad \text{[Equation 1]}$$
(for odd $N$)

$$c(k; N, M) = \exp\left(\frac{j\pi Mk^2}{N}\right) \quad \text{[Equation 2]}$$
(for even $N$)

wherein "k" is a sequence index, "N" is the length of a CAZAC sequence to be generated, and "M" is a sequence ID.

If the length (N) of the above-mentioned ZC sequence is represented by a prime number, the largest number of sequences can be used. If the sequence length (N) is not represented by the prime number, the ZC sequence is effective in the N value and a relative prime number "M" (where M=1~N−1). Therefore, it is preferable that the length of a sequence to be used is represented by the prime number.

In the case of transmitting the control signal without transmitting data according to the 3GPP LTE, a control channel can be designed as shown in FIG. 3. A basic allocation unit is called a resource block (RB). This resource block (RB) includes 12 sub-carriers.

If the value of the basic allocation unit is not represented by the prime number, it is preferable that a sequence having a prime-number length may be generated according to the length of the basic allocation unit.

There are proposed a variety of methods for generating the above-mentioned sequence having the prime-number length, for example, a first method for generating a sequence having a prime-number length longer than the N value, and cutting the sequence by a predetermined length (N) to be used; and a second method for generating a sequence having a prime-number length shorter than the N value, and disregarding the remaining parts or filling the remaining parts with "0". Also, a first method may be proposed. According to this third method, if the N length is not represented by the prime number, the CAZAC sequence may have the above-mentioned N length without any change. The above-mentioned third method has very few sequences. In this way, in the case of directly generating the sequence using the sequence length to be used, the generated sequence has superior correlation characteristics between sequences or the signal uniformity (e.g., PAPR or cubic metric) in time and frequency domains.

The following description of the present invention assumes that the above-mentioned first, second, and third methods can be used, so that one of them is properly selected according to an appropriate RB size and the number of symbols used in a TTI.

In order to transmit information using the CAZAC sequence, two methods can be used. A first method uses a CAZAC index to transmit information via the CAZAC sequence. A second method applies a cyclic shift (also called a circular shift) to a sequence corresponding to each CAZAC index in order to indicate desired information.

The second method includes a first case for directly cyclic-shifting the CAZAC sequence and a second case for applying the cyclic shift using a domain conversion. For example, according to the domain conversion, an exponential function is multiplied in a frequency domain so that a time-domain cyclic shift is applied to the frequency domain, or an exponential function is multiplied in a time domain so that a frequency-domain cyclic shift is applied to the time domain.

Based on the above-mentioned description, a direction modulation scheme and a sequence modulation scheme will hereinafter be described as detailed examples of the above-mentioned embodiment shown in FIG. 2.

The direct modulation scheme performs the DFT spreading on a transmission signal and then performs an OFDM modulation on the spread resultant signal.

Figure 1:
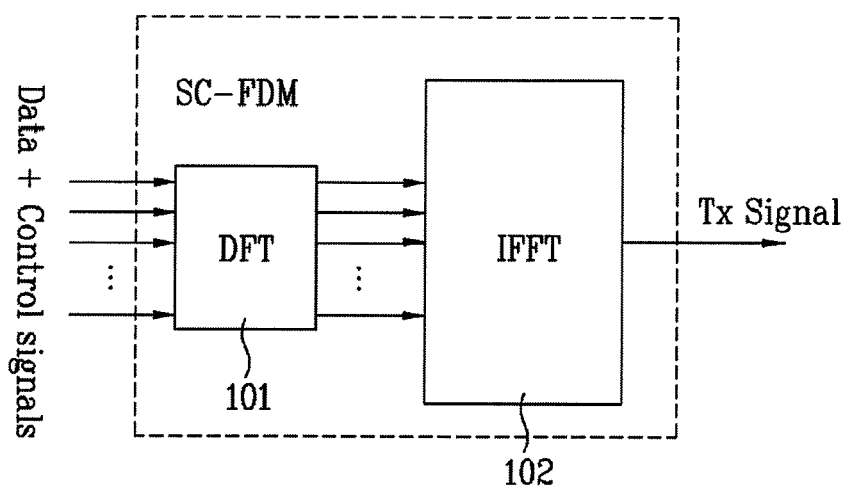
FIG. 1 is a block diagram illustrating a transmission end of a conventional SC-FDM-based communication system.

In other words, the direct modulation scheme performs the spreading process using the DFT spreading module 101 of FIG. 1, modulates a frequency-direction modulation and an additional time-direction modulation according to the above-mentioned embodiment of the present invention, and generates a TTI-unit symbol by the IFFT module 102.

The sequence modulation scheme loads a specific sequence (e.g., CAZAC, Walsh, Hadamad, Golay, or PN) to a sub-carrier. In other words, a sequence used in the sequence modulation scheme is used as information. The cyclic shift may be additionally applied to a specific sequence.

Detailed examples of the above-mentioned schemes will hereinafter be described.

Figure 5:
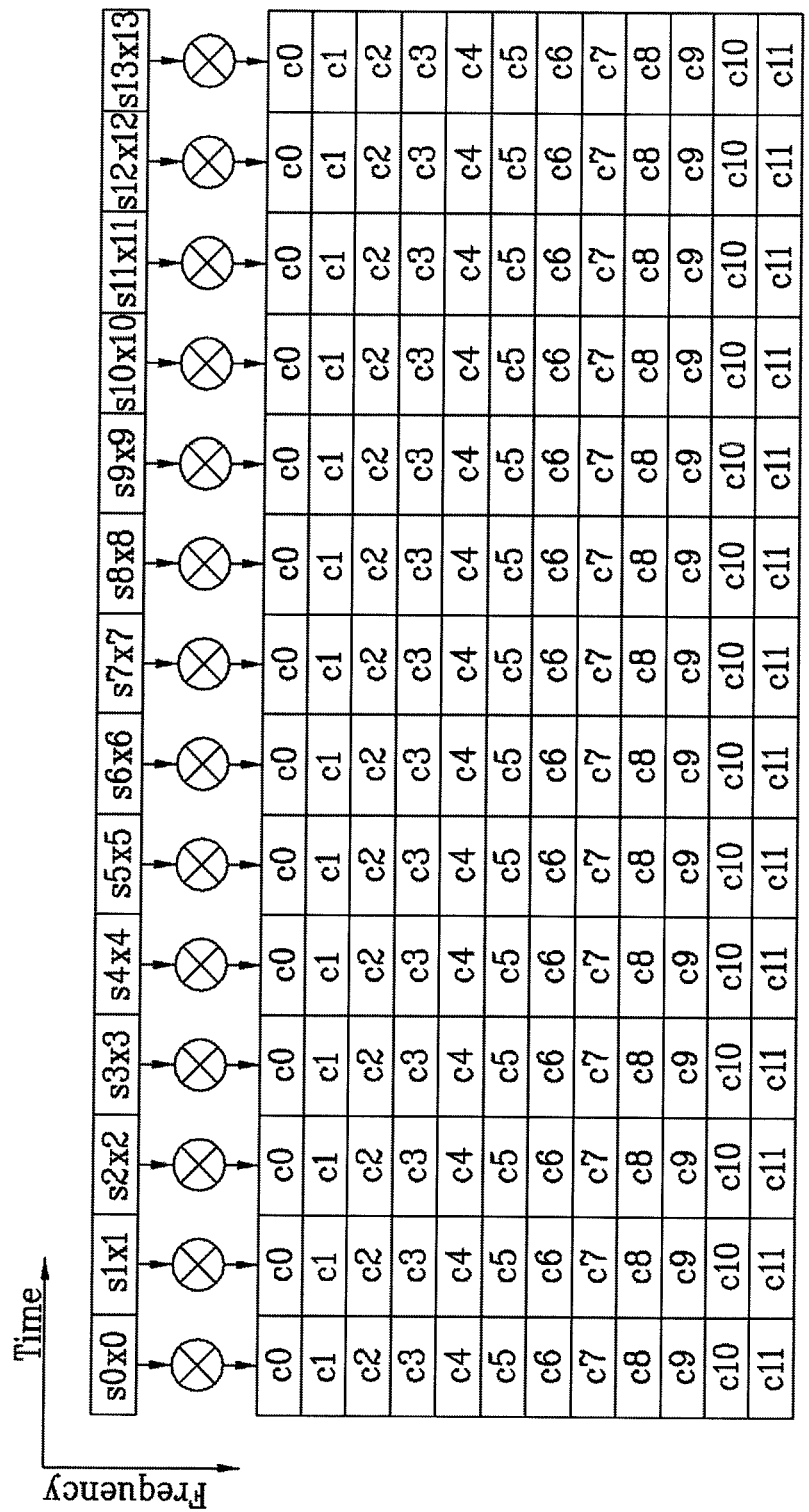
FIG. 5 is a conceptual diagram illustrating a method for generating a TTI-unit symbol modulated in time and frequency directions according to a sequence modulation scheme.

FIG. 5 is a conceptual diagram illustrating a method for generating a TTI-unit symbol modulated in time and frequency directions according to a sequence modulation scheme.

As shown in FIG. 5, a specific transmission sequence (e.g., CAZAC, Walsh, Hadamad, Golay, or PN) may be loaded on each sub-carrier, so that the resultant sub-carrier including the specific transmission sequence may be transmitted.

In this case, a sequence loaded on each sub-carrier is shown in FIG. 5. In FIG. 5, the above-mentioned specific transmission sequence (s0~s13) (e.g., CAZAC, Walsh, Hadamad, Golay, or PN) may be multiplied by a time-domain modulation sequence (x0~x13) having a predetermined length denoted by the 1 TTI.

In more detail, the specific sequence (s(0)x(0)~s(13)x(13)) modulated in the time domain may be mapped to each sub-carrier, so that the mapping result may be transmitted.

In the meantime, if required, the above-mentioned time-domain modulation sequence (s(0)x(0)~s(13)x(13)) mapped to each sub-carrier may be multiplied by a frequency-domain modulation sequence (c(k)). In this case, the frequency-domain modulation sequence c(k) may be represented by an exponential function, so that a transmission sequence s(n) can be cyclic-shifted in the time domain by the exponential function shown in the following equation 3:

$$c(k)=\exp(-jSw_0k) \quad \text{[Equation 3]}$$

In Equation 3, "n" is a time-domain symbol index, "k" is a frequency-domain sub-carrier index, " " is a unit phase associated with a cyclic shift, and "S" is an indeed value indicating the degree of the cyclic shift.

Therefore, transmission information in the final time/frequency-domain-modulated TTI unit sequence can be classified into a cyclic shift of c(k), a transmission sequence of s(n), and cyclic shift information of x(n).

In the case of generating/transmitting the TTI unit symbol according to the above-mentioned scheme, there is no distortion in the PAPR/CM, so that more transmission information can be transmitted. In the meantime, the use of the s(n) value may be changed according to the amount of data to be transmitted. In other words, in the case of s(n), the same value may be assigned to all of "n" values (wherein transmission information is transmitted to the remaining two options), or different values may also be assigned to the "n" values.

In the meantime, according to a detailed embodiment of the present invention, the Frequency Hopping is additionally applied to the TTI unit symbol generated by the sequence modulation scheme of FIG. 5, so that an additional diversity gain can be acquired.

Figure 6:
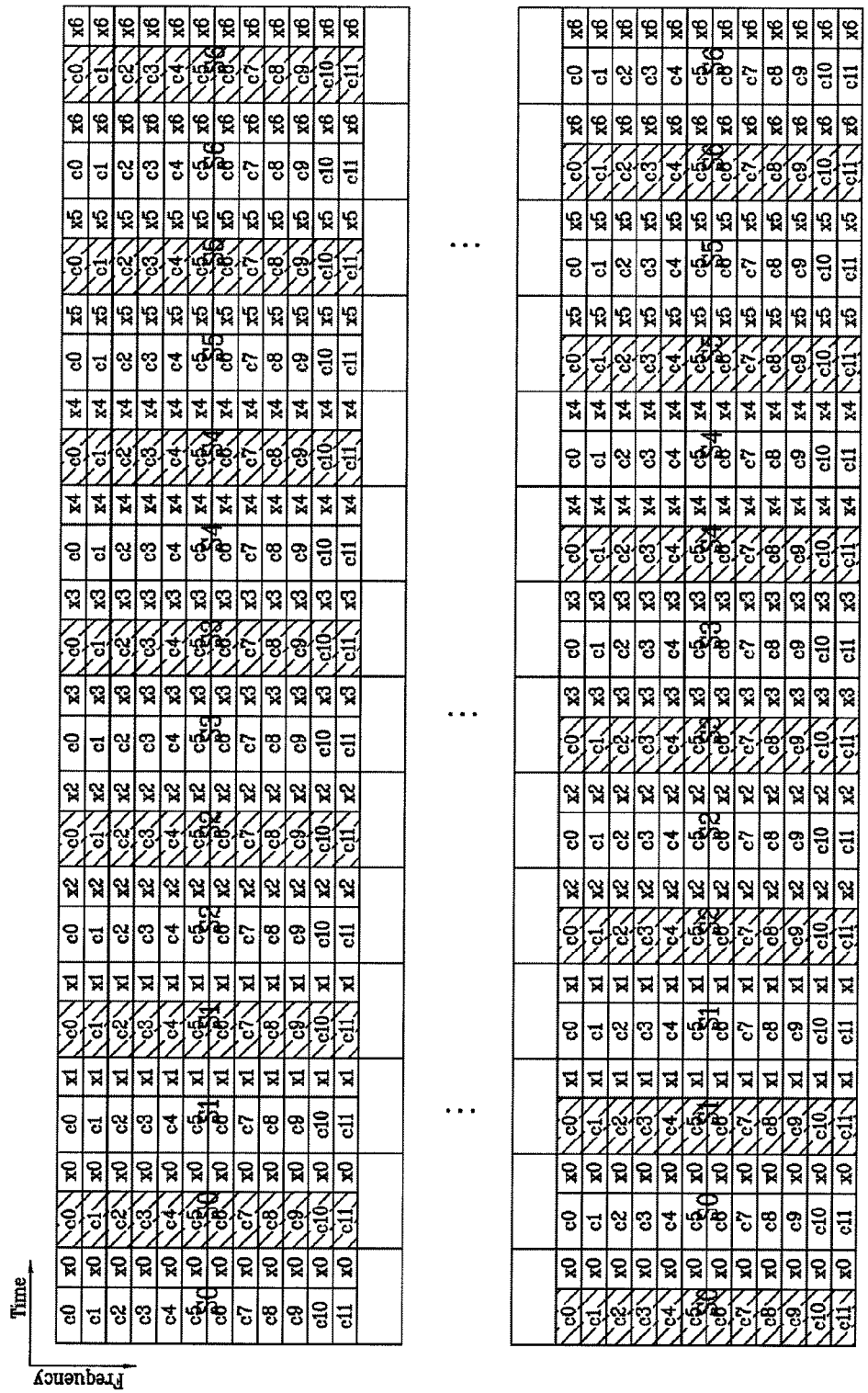
FIGS. 6 and 7 are conceptual diagrams illustrating a variety of methods for applying the hopping to the TTI-unit symbol of FIG. 5 according to the present invention.
Figure 7:
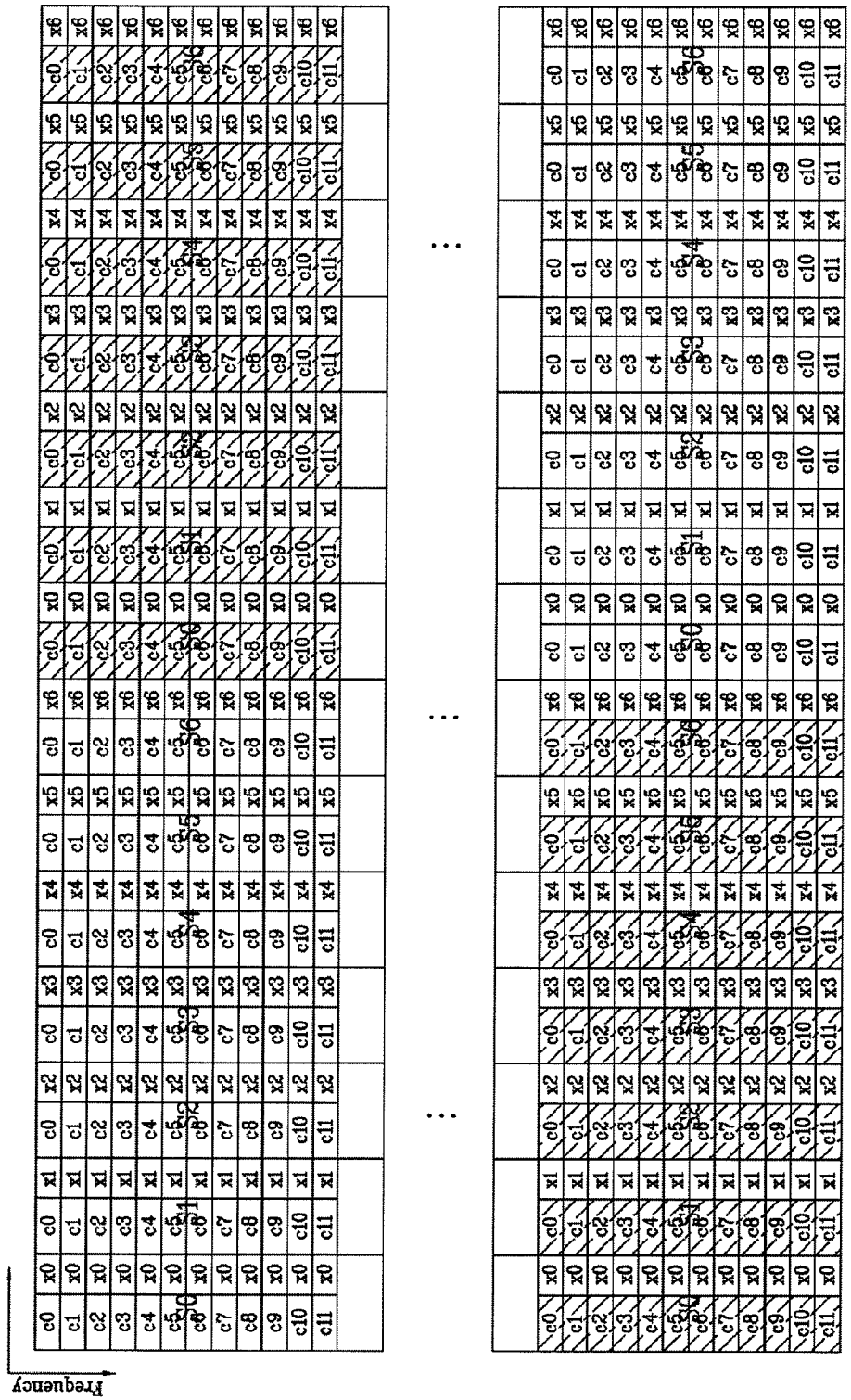

FIGS. 6 and 7 are conceptual diagrams illustrating a variety of methods for applying the hopping to the TTI-unit symbol of FIG. 5 according to the present invention.

Referring to FIGS. 6 and 7, if the TTI unit symbol generated by the scheme of FIG. 5 is applied to a control channel structure capable of transmitting only a control signal and excluding other data, i.e., if a control signal is transmitted over a sub-carrier area acting as a control channel, which has been allocated to one end or both ends of a system band, the transmission structure of FIG. 6 or 7 changes a transmission frequency band in units of a predetermined symbol so that it acquires a frequency-domain diversity gain.

The reason why the hopping scheme is applied to the structure of FIG. 6 or 7 is to acquire a diversity gain along a propagation path although one channel has a poor condition.

In more detail, FIG. 6 shows an exemplary structure in which a frequency band of each symbol is changed at intervals of a predetermined time corresponding to a single symbol. FIG. 7 shows an exemplary structure in which the 1 TTI is divided into two sections, so that symbols of each domain are transmitted over different frequency bands.

The hatching parts of FIG. 6 or 7 indicates a location at which control information is transmitted, and the non-hatching parts of FIG. 6 or 7 indicates a location at which the control information is not transmitted. It should be noted that symbols generated by different sequences may be transmitted to the hatching and non-hatching parts of FIG. 6 or 7, or different parts of symbols generated by the same sequence may also be transmitted to the hatching and non-hatching parts.

Figure 8:
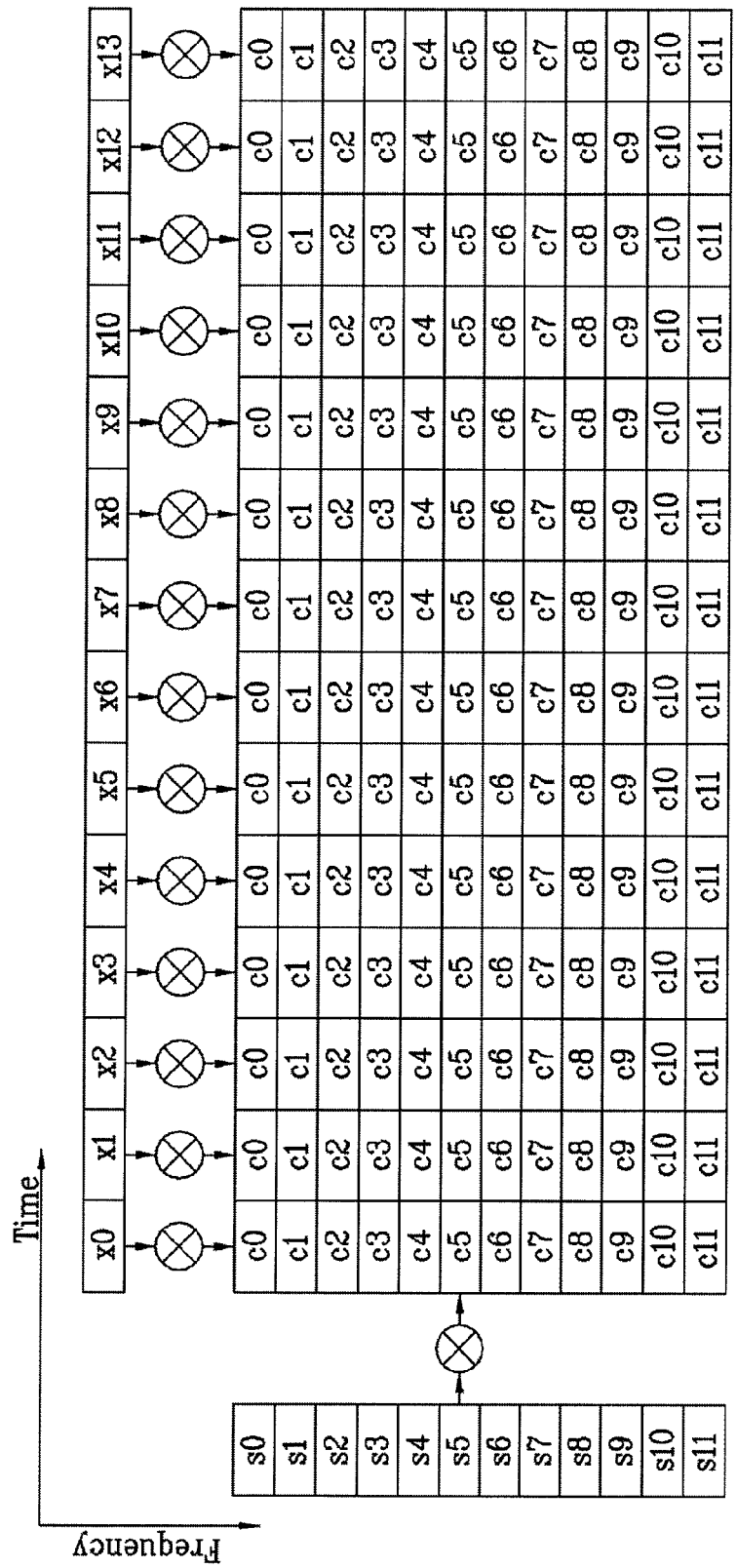
FIG. 8 is a conceptual diagram illustrating a method for generating the TTI-unit symbol modulated in time and frequency directions according to a direct modulation scheme according to another embodiment of the present invention.

FIG. 8 is a conceptual diagram illustrating a method for generating the TTI-unit symbol modulated in time and frequency directions according to a direct modulation scheme according to another embodiment of the present invention.

Referring to FIG. 8, the direct modulation scheme directly loads a transmission sequence on a sub-carrier, differently from the sequence modulation scheme of FIG. 5. In this way, in the case of generating a signal according to the direct modulation scheme, the generated signal must undergo the spreading caused by the DFT module 101, and a sequence used as a mask in a sub-carrier level is used according to a spectral shaping scheme.

In this case, if a transmission sequence s(k) loaded on the sub-carrier has the same value for each OFDM symbol, additional information (e.g., cyclic shift) may be acquired from the frequency-direction modulation sequence c(k) used as a sub-carrier-directional masking.

Differently from the above-mentioned description, if different symbols are applied to sub-carriers of all the OFDM symbols, the frequency-direction modulation sequence c(k) may be set to a scrambling sequence.

In the meantime, the frequency-domain-modulated sequences may be additionally modulated in a time domain by the time domain modulation sequences x(0)~x(13) in the TTI unit as shown in FIG. 8.

Therefore, in the time/frequency-direction modulated TTI-unit symbols s(k) shown in FIG. 8, transmission information may also be transmitted via each sub-carrier symbol s(k), a sub-carrier level-modulation sequence c(k), or a TTI-unit time-domain modulation sequence x(n).

The hopping scheme of FIG. 6 or 7 can also be applied to the above-mentioned direct modulation scheme. However, each sub-carrier level of the direct modulation scheme requires accurate channel estimation due to a sub-carrier level modulation of the transmission sequence, so that it is preferable that the hopping may not be applied to the direct modulation scheme or may also be applied to the same according to the scheme of FIG. 7.

In the meantime, in association with FIGS. 5 to 8, the transmission sequence s(k) disclosed in the above-mentioned TTI-unit symbol generation method may indicate specific control information to be transmitted.

In this case, the above-mentioned control information may indicate either one of control information (e.g., ACK/NACK, or CQI). However, it should be noted that heterogeneous control information (e.g., ACK/NACK, and CQI) may be scrambled by the DFT spreading. In other words, one embodiment of the present invention may scramble heterogeneous control information at a position ahead of the DFT spreading module of FIG. 1, so that a transmission sequence may be generated according to the scrambled result.

A method for transmitting a TTI-unit signal according to another embodiment of the present invention will hereinafter be described.

Figure 9:
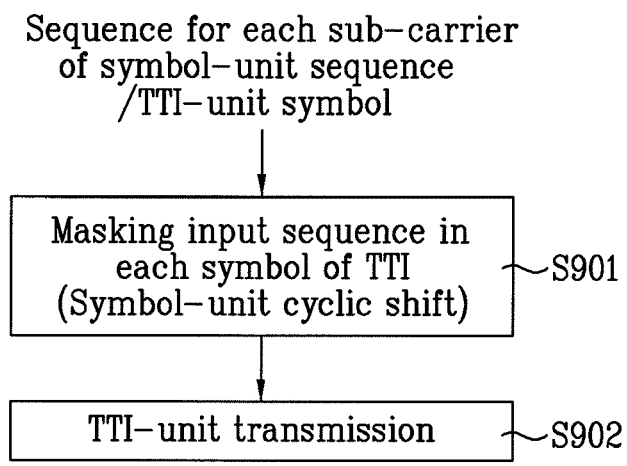
FIG. 9 is a flow chart illustrating a method for transmitting a TTI-unit symbol according to one embodiment of the present invention.

FIG. 9 is a flow chart illustrating a method for transmitting a TTI-unit symbol according to the present invention.

The TTI-unit signal transmission method considers that a communication system simultaneously transmits signals in TTI units, instead of symbol units, so that each transmission sequence is masked in a time-domain symbol within the 1 TTI and the masking result is transmitted. In this case, the transmission sequence may be a time-direction sequence per sub-carrier of a time/frequency-direction-modulated TTI unit symbol. Otherwise, the transmission sequence may be a predetermined symbol unit transmission sequence in the same manner as in the above-mentioned embodiment.

The above-mentioned predetermined symbol unit sequence or the time-direction sequence per sub-carrier of the TTI unit symbol are masked in each OFDM symbol area associated with the time domain within the 1 TTI at step S901. For the convenience of description, the predetermined symbol unit sequence and the time-direction sequence are generically named "input sequences".

In this case, the input sequences may be sequentially masked in each OFDM symbol. If the cyclic shift is applied to the order of masking the input sequences in the OFDM symbol, additional information may also be transmitted. The above-mentioned cyclic shift is indicative of a symbol-unit cyclic shift, and is different from those of FIGS. 5 to 8. As previously stated above, the cyclic shift of FIGS. 5 to 8 has been designed to be applied within each symbol.

Thereafter, the time-domain-modulated sequence generated at step S901 is transmitted in TTI units at step S902. According to this method, the transmission sequence is modulated in a time direction so that additional information can be transmitted.

If the above-mentioned scheme is applied to a control channel structure for transmitting only the control signal and excluding other data in the SC-FDM-based communication system, a detailed description thereof will hereinafter be described.

Figure 10:
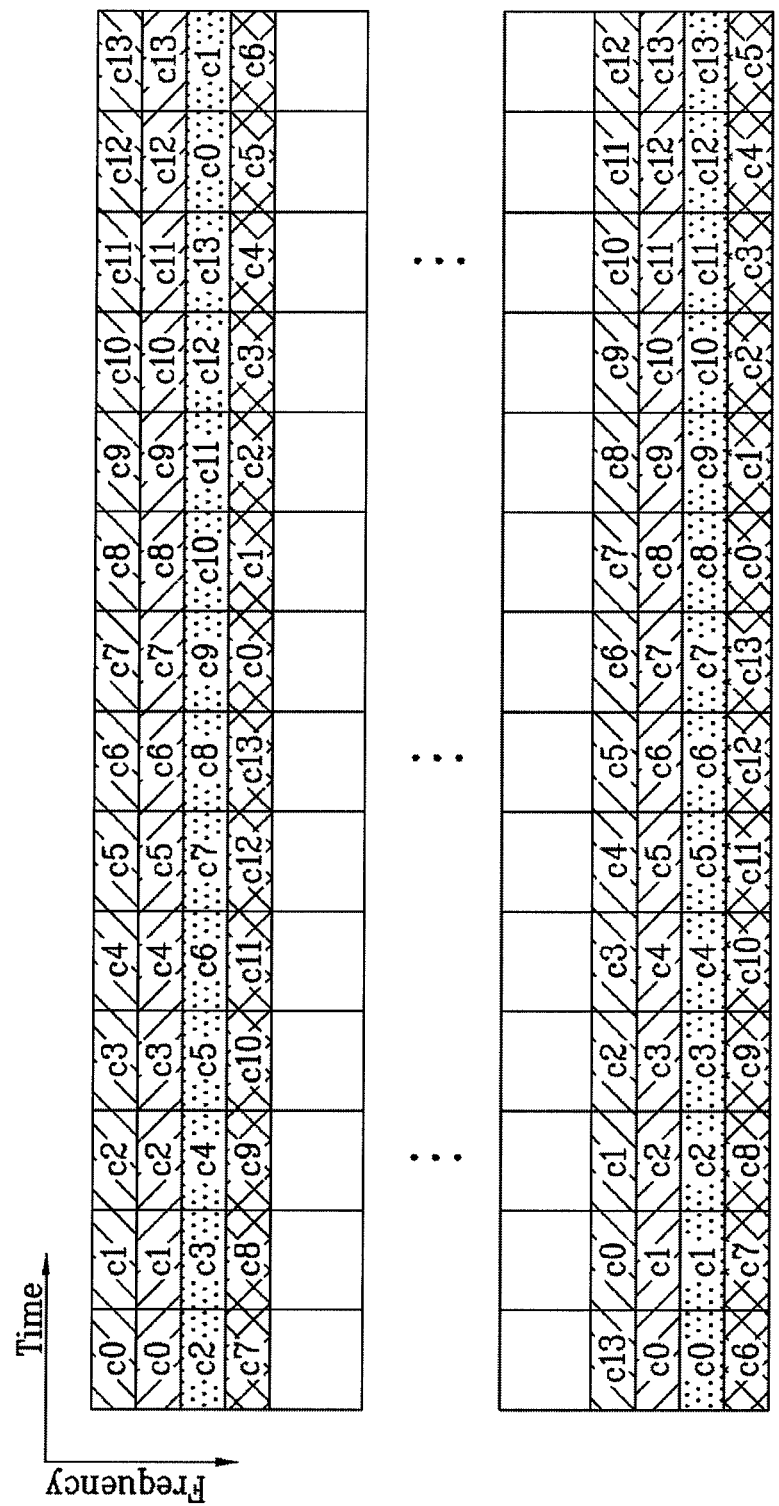
FIG. 10 is a conceptual diagram illustrating a method for performing a time-domain modulation on a transmission symbol in TTI units, and transmitting the modulated symbol according to one embodiment of the present invention.

FIG. 10 is a conceptual diagram illustrating a method for performing a time-domain modulation on a transmission symbol in TTI units, and transmitting the modulated symbol according to one embodiment of the present invention.

In more detail, the exemplary structure of FIG. 10 is acquired when a CAZAC sequence acting as a transmission symbol is applied in a time domain of a TTI unit. The structure of FIG. 10 is acquired when the CAZAC sequence is modulated in a predetermined resource block (which is considered to be a single lump irrespective of signal structures) of each OFDM symbol.

If the OFDM symbol structure is considered in the 3GPP LTE, a total of 14 OFDM symbols are contained in the 1 TTI, so that the CAZAC sequence may have the length denoted by N=14. In this case, there are a variety of methods for generating transmission sequences respectively mapped to the OFDM symbols in a time domain, for example, a cyclic copy scheme for generating/using a sequence based on a prime-number length to guarantee a sufficient number of CAZAC sequences, a truncation scheme, and a method for employing the length of N=14 without any change. In association with FIG. 2, as described above, the present invention may use sequences, per sub-carrier, of TTI unit symbols modulated in the time and frequency directions.

If the transmission sequences are masked in the time-domain OFDM symbol, a cyclic shift toward the time domain may be applied to the transmission sequences as shown in FIG. 10.

In more detail, transmission sequences are sequentially masked in first and second sub-carriers of FIG. 10. However, at a third sub-carrier, the cyclic shift corresponding to two OFDM symbols is applied to transmission sequences of the third sub-carrier, so that the cyclic-shifted sequences are transmitted. At a fourth sub-carrier, the cyclic shift corresponding to seven OFDM symbols is applied to transmission sequences of the fourth sub-carrier. The above-mentioned time-direction cyclic shift within the TTI is performed in symbol units when transmission sequences are mapped to the OFDM symbols, and is different from those of FIGS. 5 to 8 in which the cyclic shift has been applied within a single OFDM symbol.

Therefore, in the case of masking the CAZAC sequence in symbol units, the present invention may acquire the sufficient number of cyclic shifts available for the CAZAC sequence, wherein the number of cyclic shifts corresponds to a sequence length. This cyclic shift of FIG. 10 can maintain orthogonality between sequences even when the delay spreading is very large, differently from the cyclic shifts of FIGS. 5 to 8.

Also, the cyclic shift of FIG. 10 uses a sequence having 14 lengths corresponding to the number of symbols contained in the TTI, so that the number of applicable cyclic shifts may also be set to "14". The number of root sequences varying with the length is set to about "14", so that the embodiment of FIG. 10 can guarantee many more root sequences than those of another case in which the length of 12 sub-carriers is used in a frequency domain, thereby solving the cell planning problem.

And, the transmission scheme of FIG. 10 applies a symbol-unit cyclic shift within the TTI to TTI unit symbols generated by the schemes of FIGS. 5 to 8, so that it can transmit additional information.

According to the embodiment of FIG. 10, UEs can be distinguished from each other by the cyclic shift or the root sequence index. One embodiment of the present invention provides a method for using the cyclic shift of FIG. 10 to make a UE distinction or using the same cyclic shift as control signal information.

For example, the scheme of FIG. 10 allocates two cyclic shift sequences having the same root sequence indexes to a single UE, and allows ACK/NACK values to correspond to individual cyclic shift values, so that the resultant signal is transmitted. This format can be effectively used when the ACK/NACK channels are constructed in a control channel of FIG. 3 according to the FDM scheme.

According to a coherent scheme, the use of the CAZAC sequence is limited in the FDM scheme, a pilot is required for transmitting a message because a control symbol is directly applied to each sub-carrier.

According to a non-coherent scheme, the CAZAC sequence is masked in the time domain as shown in FIG. 10 and different cyclic-shift sequences are directly applied to the masked result according to the control information, so that 7 ACK/NACK signals per FDM resource block can be simultaneously transmitted.

According to one embodiment of the present invention, the present invention transmits control information using the symbol-unit cyclic shift in the time domain, so that it discriminates between a variety of information using the cyclic shift itself without using the pilot, and transmits the resultant information. As a result, the present invention can support a non-coherent searching scheme of a reception end.

According to another embodiment of the present invention, the present invention may further support the coherent detection scheme, which uses a time-domain symbol-unit cyclic shift to additionally discriminate between users or UEs and makes a distinction of control information by channel estimation based on the pilot.

A method for supporting the coherent scheme and the non-coherent scheme will hereinafter be described in detail.

According to a detailed embodiment of the present invention, the frequency hopping for acquiring the diversity gain may be additionally applied to the transmission method of FIG. 10.

Figure 11:
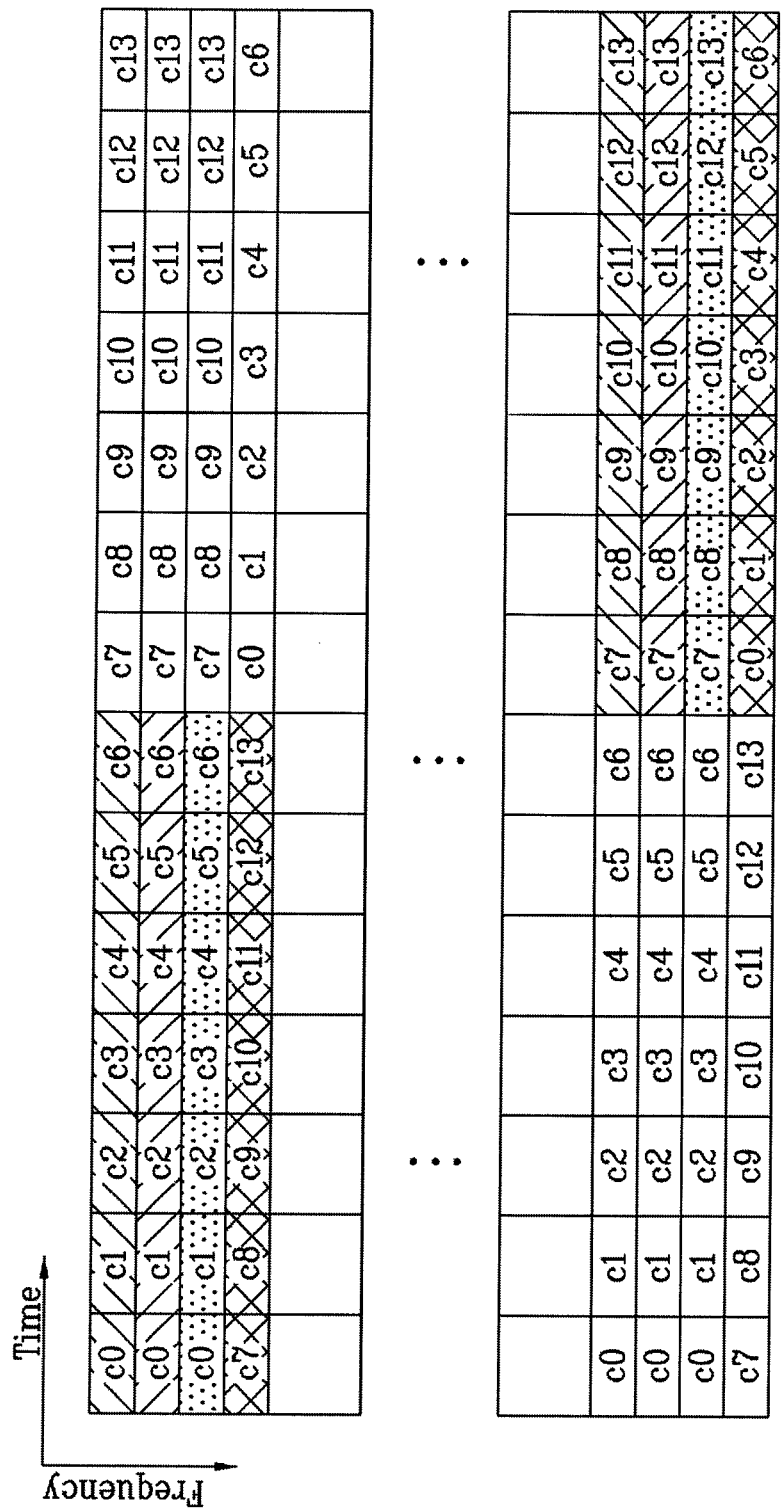
FIGS. 11 to 14 are conceptual diagrams illustrating a variety of methods for applying the hopping to a transmission format shown in FIG. 11 according to the present invention.

FIGS. 11 to 14 are conceptual diagrams illustrating a variety of methods for applying the hopping to a transmission format shown in FIG. 11 according to the present invention.

Referring to FIGS. 11 to 14, if the CAZAC sequence is used as a transmission sequence of a time-direction symbol unit as shown in FIG. 10, and the channel hopping is performed to acquire a diversity gain on a frequency axis, the hopping of sequence modulation also occurs. In FIGS. 11 to 15, the same background patterns are indicative of the same transmission sequences.

Figure 12:
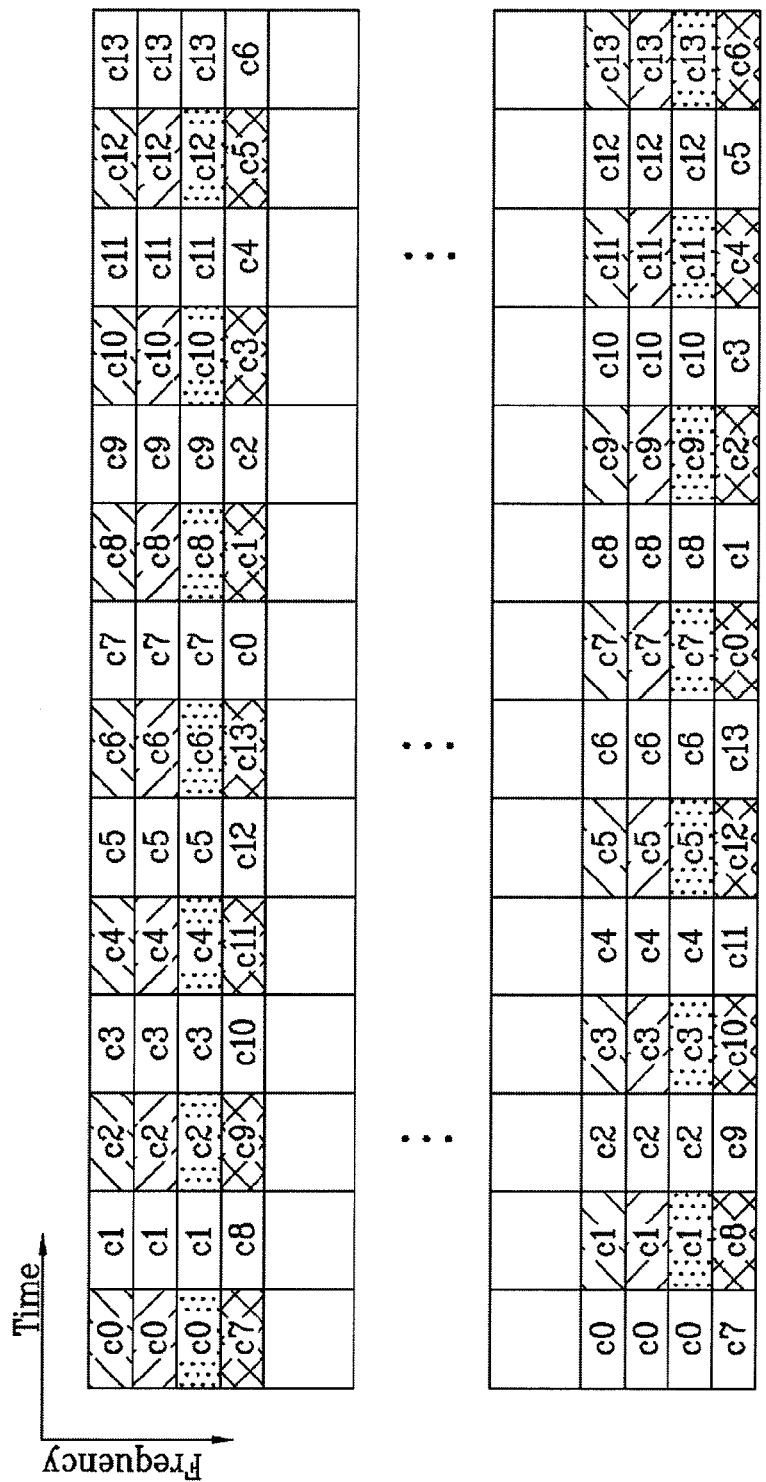

In this case, two access methods can be considered. According to a first method, as shown in FIGS. 11 and 12, a sequence having the length of 14 is masked in a resource area without any change irrespective of the frequency hopping, after the resource area has been frequency-hopped at intervals of a predetermined symbol, so that the first method has an advantage in that it can maintain the sequence length of 14.

In the meantime, due to the aforementioned hopping, channel responses associated with channel resources (i.e., control channel resources) may be different from each other. These different channel resources may unexpectedly affect the orthogonality of sequences, so that another embodiment of the present invention provides a method for applying the same sequences to only OFDM symbols contained in the same resource, as shown in FIGS. 13 and 14.

Figure 13:
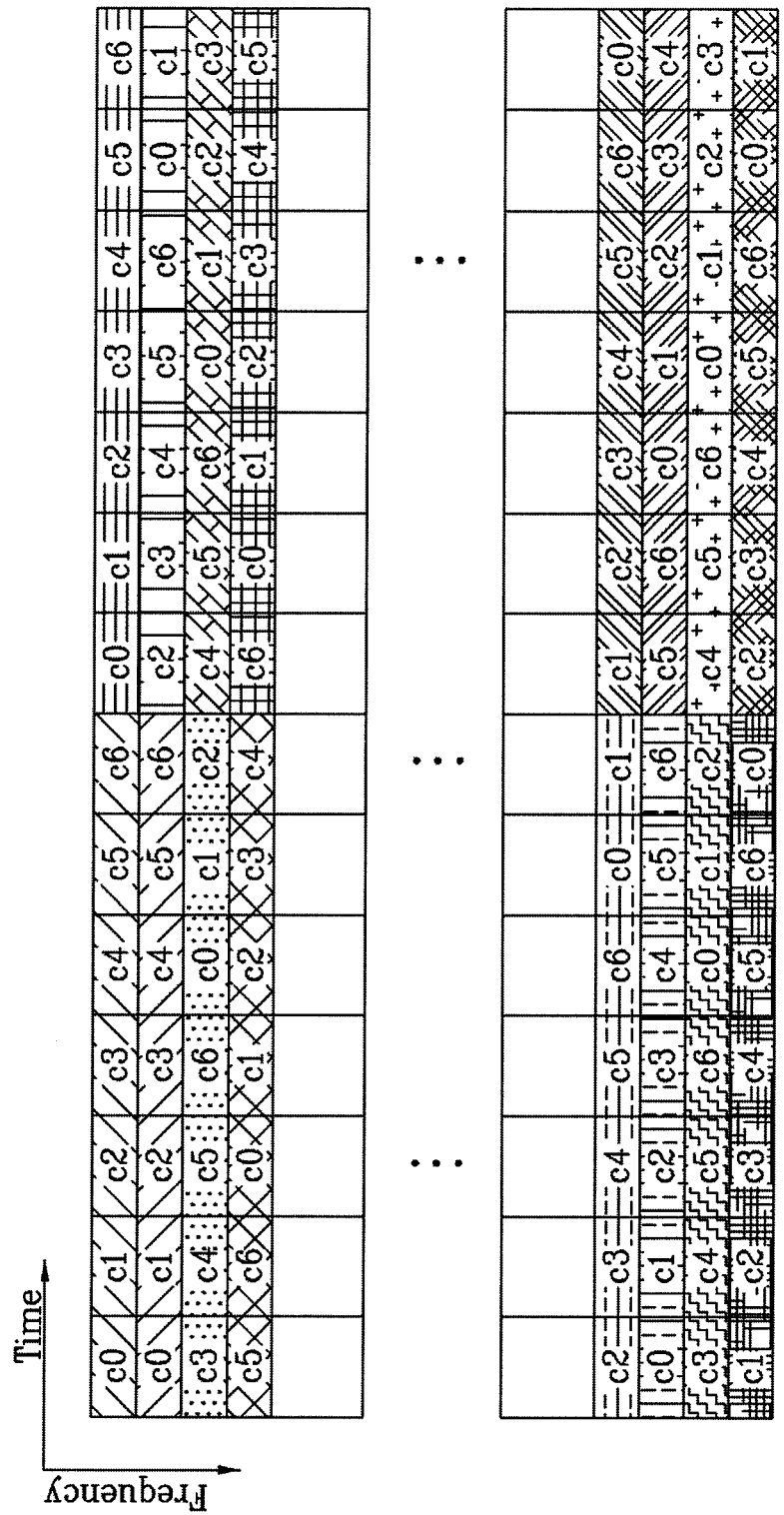
Figure 14:
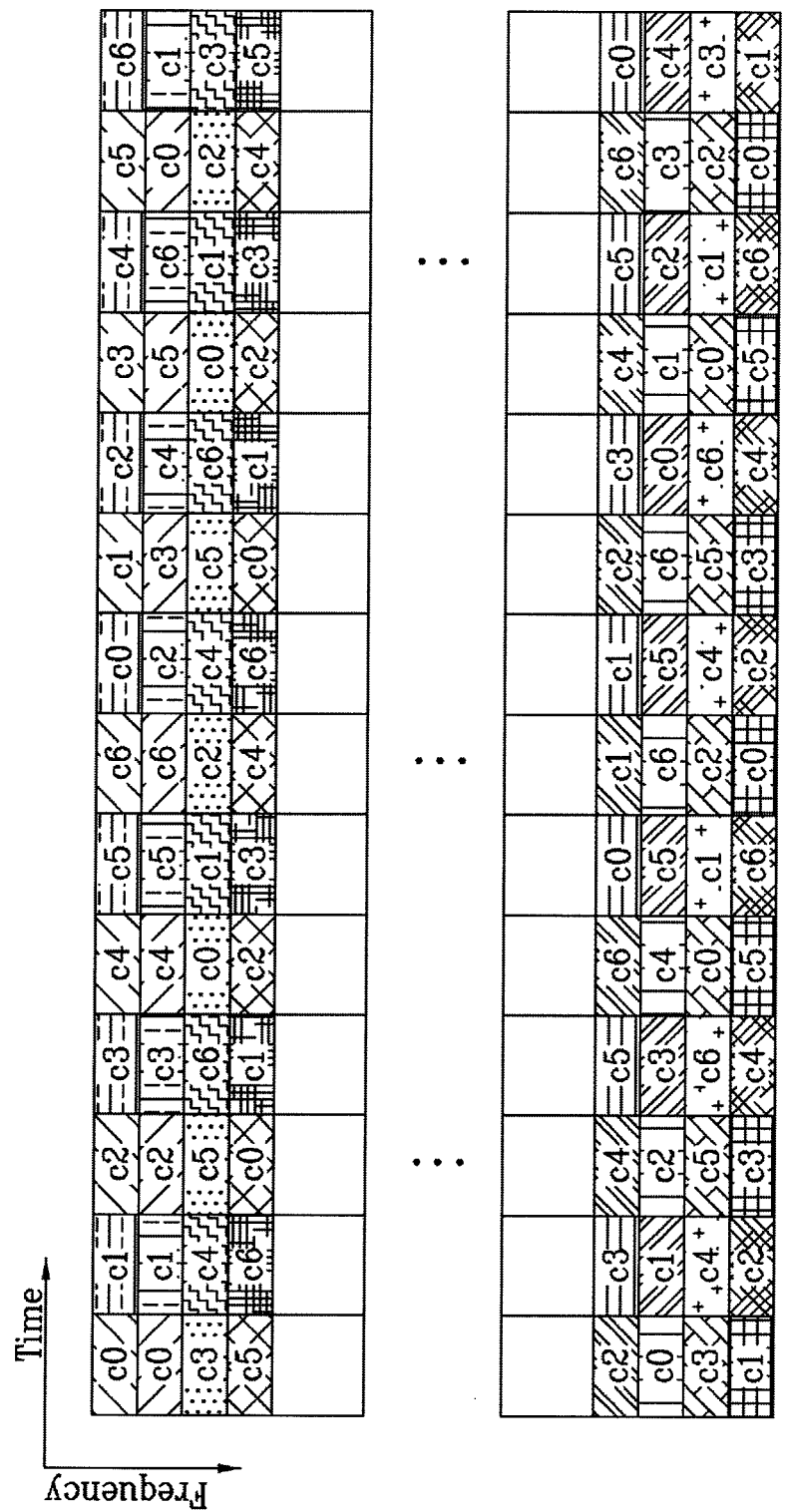

If the same sub-carrier is repeatedly used by the hopping of a control-signal location as shown in FIGS. 13 and 14, a sequence length corresponding to the number of repeating times of the sub-carrier is adapted to perform the masking. In this case, the length of a transmission sequence of FIG. 13 or 14 is the half of that of FIG. 11 or 12.

In the meantime, according to a detailed embodiment of the present invention, although there is no hopping process as shown in FIG. 10, the present invention may also perform a modulation process using a half-length CAZAC sequence, so that it can be compatible with the above-mentioned case of FIG. 13 or 14 in which the sequence length is cut in half by the frequency hopping.

The above-mentioned embodiment of the present invention has disclosed the method for supporting the non-coherent searching scheme capable of discriminating between different control information using only the cyclic shift applied to the sequence. In the case of supporting the non-coherent searching scheme, the amount of transmittable information in the non-coherent searching scheme may be less than that of the coherent searching scheme.

Therefore, one embodiment of the present invention provides a method for inserting a pilot in a control channel to search for control information according to the coherent scheme, simultaneously while considering the number of guaranteed sequences and the accuracy of channel estimation.

In more detail, in the case of using the same sequence as the CAZAC sequence, it is more preferable that the length of the sequence has a prime number in order to guarantee a sufficient number of sequences. For example, if the above-mentioned process is performed in 14 OFDM symbol units, the pilot is inserted into a single OFDM symbol, so that the symbol length to which the sequence is applied may be set to "13". And, under the same situation, the pilot is inserted into three OFDM symbols, so that the symbol length to which the sequence is applied may be set to "11".

Figure 15:
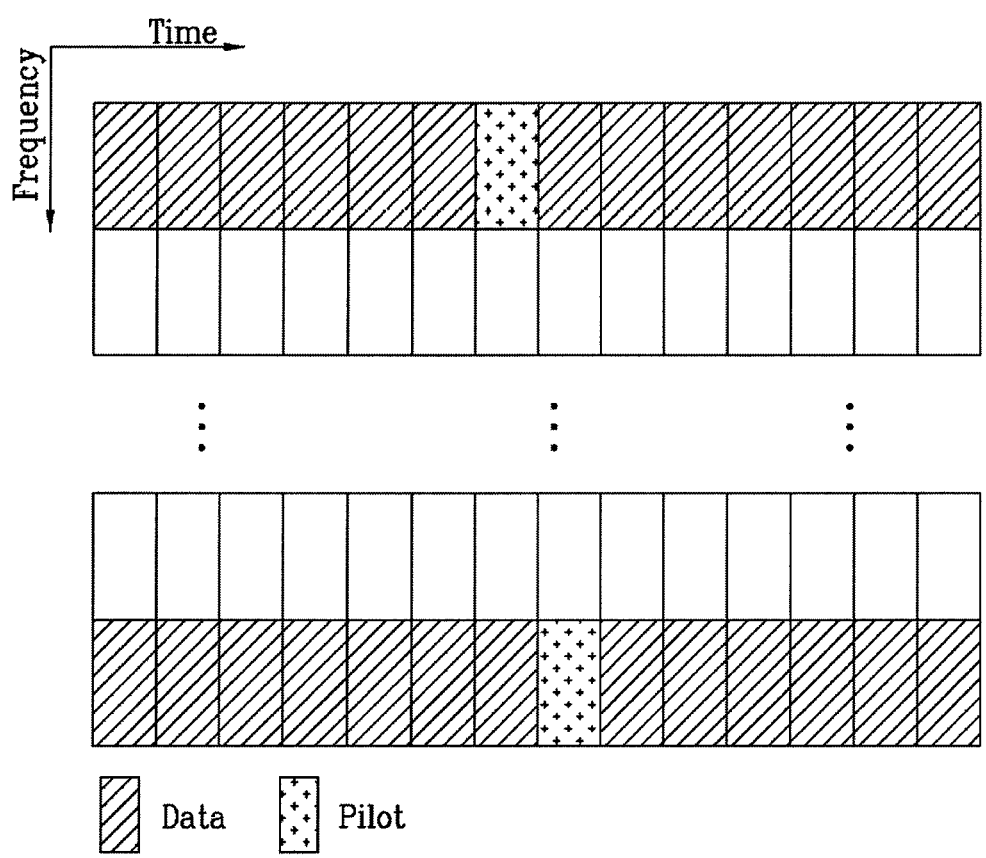
FIGS. 15 to 17 are conceptual diagrams illustrating method for inserting a pilot into a TTI-unit symbol based on a coherent scheme according to one embodiment of the present invention.
Figure 16:
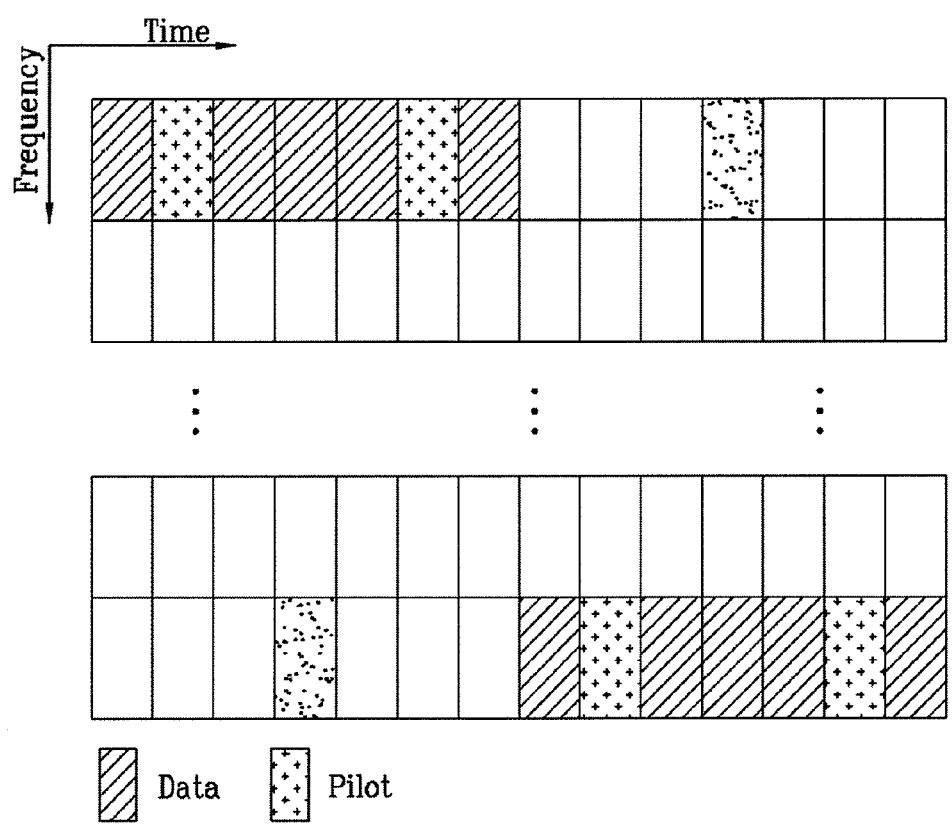
Figure 17:
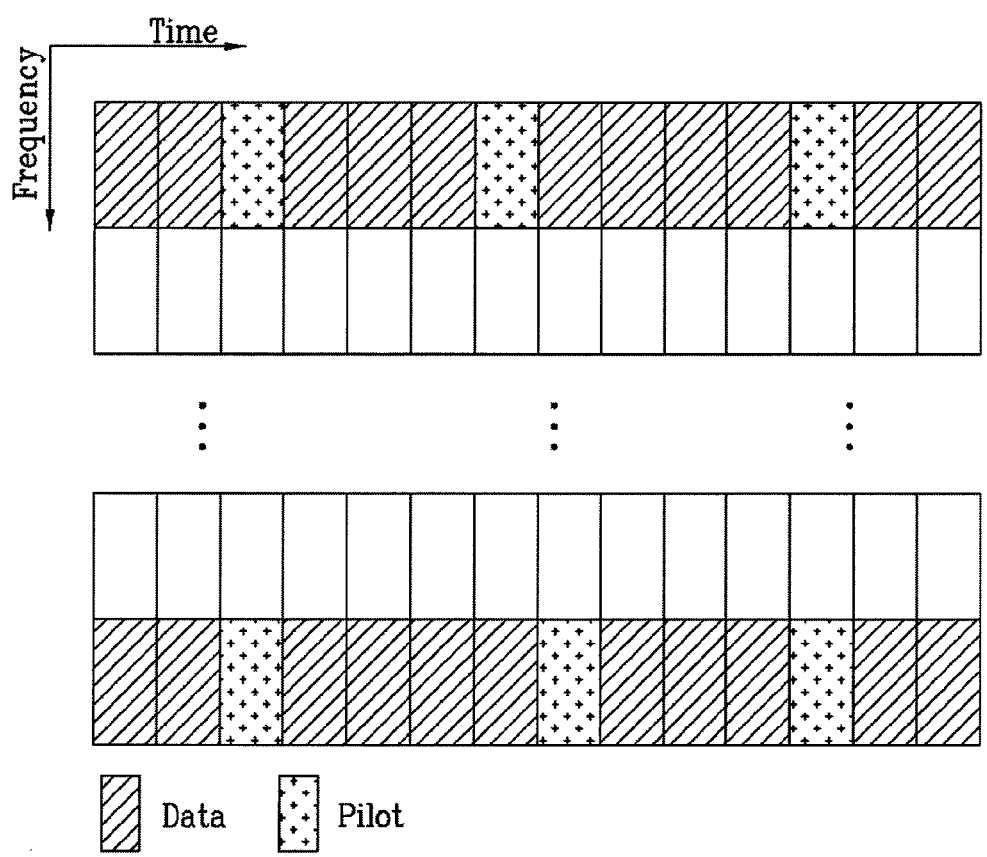

FIGS. 15 to 17 are conceptual diagrams illustrating method for inserting a pilot into a TTI-unit symbol based on the coherent scheme according to one embodiment of the present invention.

In the case of inserting the pilot into a single OFDM symbol as shown in FIG. 15, it is preferable that the frequency hopping is not in use. The OFDM symbol in which the pilot is inserted may be located at the center of a transmission unit, so that the channel estimation can be effectively performed at the center of the transmission unit.

FIG. 15 shows an exemplary structure in which the pilot is applied to a seventh or eighth OFDM symbol from among 14 OFDM symbols of the 1 TTI.

FIG. 16 shows an exemplary structure in which the pilot is applied to three OFDM symbols from among 14 OFDM symbols of the 1 TTI, and the frequency hopping is applied to seven OFDM symbols from among the 14 OFDM symbols.

As can be seen from FIG. 16, three OFDM symbols are used for pilots. In the case of applying the frequency hopping the structure of FIG. 16, a single OFDM symbol for only one pilot is arranged at one of two parts (each part composed of 7 OFDM symbols), and two OFDM symbols for two pilots are arranged at the other one. The single OFDM symbol for only one pilot is arranged at the center of a corresponding hopping area, and the remaining two OFDM symbols for two pilots are spaced apart from each other by a predetermined distance in the other hopping area.

FIG. 17 shows an exemplary structure in which three OFDM symbols from among 14 OFDM symbols within the 1 TTI are used for pilots, and the frequency hopping is not applied to the structure of FIG. 17. In this way, if three OFDM symbols are used as pilots without performing the frequency hopping, it is preferable that these three OFDM symbols may be equally arranged at the center part within the 1 TTI.

According to this embodiment employing the coherent searching scheme, if pilots are arranged as shown in FIGS. 15 to 17, the length of a modulated sequence may be denoted by a prime number. So, in the case of using the CAZAC sequence, the above-mentioned embodiment based on the coherent searching scheme can acquire a maximum number of sequences, OFDM symbols for pilots are spaced apart from each other by the same distance in the center part of a transmission area, so that it can improve a channel estimation performance.

In the meantime, if the number of OFDM symbols to be used as pilots is changed, for example, if two pilots (or three pilots) are allocated to each hopping area of FIG. 16, the sequence length in each hopping area is 10 (or 8), so that the sequence length to be used is not denoted by a prime number.

In this case, basically, the pilots are spaced apart from each other by the same distance in the hopping area, so that they provide other OFDM symbols with an appropriate channel estimation performance. However, it should be noted that the above-mentioned pilots may also be arranged to share a pilot location of a data area.

According to one embodiment of the present invention, if the number of OFDM symbols to be applied to a sequence is not denoted by a prime number, the present invention generates the sequence on the basis of the length of a prime number less than the number of OFDM symbols, and performs the cyclic copy on the remaining parts or inserts the value of "0" in the same remaining parts, so that it can guarantee a maximum number of sequences of a corresponding OFDM symbol length. Also, the present invention generates a sequence on the basis of the length of a prime number higher than the number of OFDM symbols, truncates a sequence part longer than the number of OFDM symbols, and guarantees the number of available sequences.

The above-mentioned description has disclosed the method for transmitting a control signal to support the coherent searching scheme and method for transmitting such a control signal to support the non-coherent searching scheme. In the meantime, according to one embodiment of the present invention, the coherent searching scheme may be combined with the non-coherent searching scheme, and a detailed description thereof will hereinafter be described.

Figure 18:
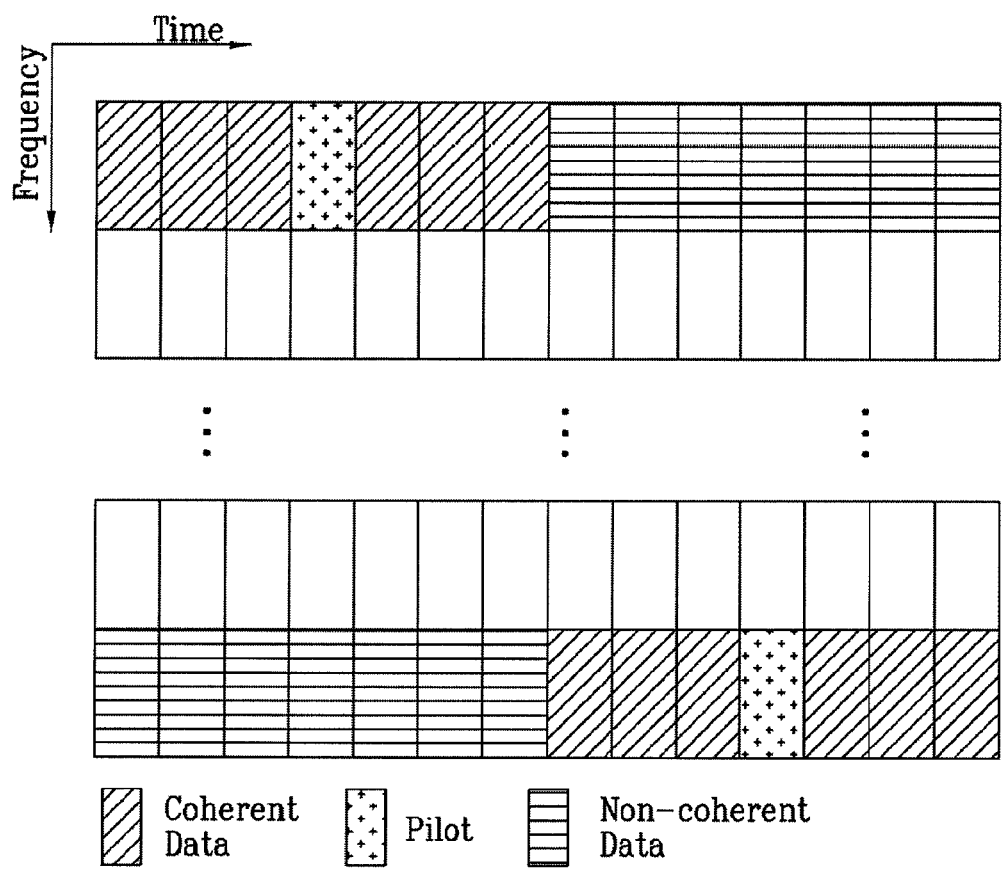
FIGS. 18 and 19 are conceptual diagrams illustrating methods for merging a coherent-based channel with a non-coherent-based channel, and using the merged result according to embodiments of the present invention.
Figure 19:
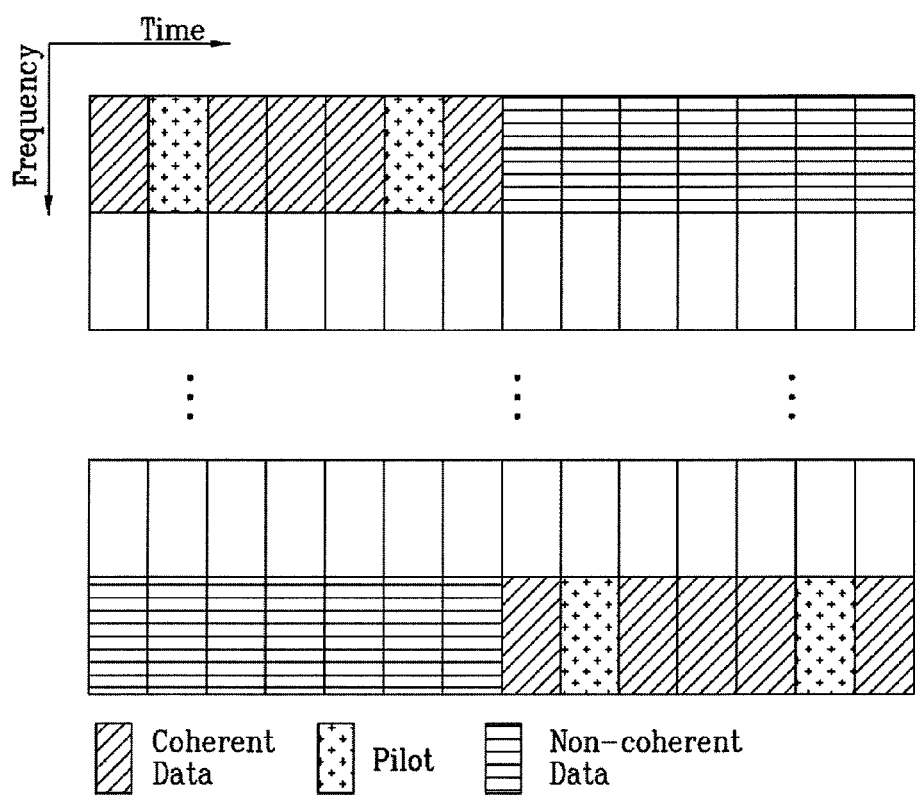

FIGS. 18 and 19 are conceptual diagrams illustrating methods for merging a coherent-based channel with a non-coherent-based channel, and using the merged result according to embodiments of the present invention.

The embodiment of FIG. 18 or 19 properly combines the coherent scheme with the non-coherent scheme, so that there is no need to insert the pilot in the coherent scheme, and the number of transmittable information is not reduced in the non-coherent scheme.

Specifically, one half of a control channel has a signal structure for the coherent searching, i.e., a control signal symbol directly indicates each symbol. The other half uses a signal structure for the non-coherent searching, wherein each symbol does not indicate a control signal symbol, and each sub-carrier area is designed to indicate a signal using either the sequence itself or the cyclic shift applied to this sequence.

Referring to FIGS. 18 and 19, as can be seen from an upper left part and lower right part inside of the TTI, pilots are inserted into the upper left part and the lower right part to perform the coherent searching, and are then transmitted.

A lower left part and an upper right part in the TTI in FIGS. 18 and 19 indicate corresponding information using the sequence itself or the cyclic shift applied to this sequence, resulting in the implementation of the non-coherent searching.

Needless to say, the coherent area and the non-coherent area of FIGS. 18 and 19 may be replaced with each other, and the number of symbols for pilots in the coherent area may also be different from that of FIG. 18 or 19 as necessary.

As described above, the method for generating the TTI-unit OFDM symbol and transmitting the TTI unit according to various embodiments of the present invention can be applied to a variety of situations, and it can support both the coherent scheme and the non-coherent scheme.

Individual embodiments of the present invention can be applied to the communication system according to a variety of schemes, for example, a coherent scheme, a non-coherent scheme, and a combination thereof, and detailed description thereof will hereinafter be described in detail.

The coherent transmission/reception scheme must perform channel estimation at a reception end, and must perform a channel operation for compensating for the channel estimation at the reception end, so that pilot signals must be inserted as shown in FIGS. 15 to 17. If the pilot signals are inserted into the structures of FIGS. 15 to 17, the number of OFDM symbols available for the transmission sequences in the time domain is reduced.

For example, if 14 OFDM symbols exist in a single subframe (i.e., 1 TTI) based on the 3GPP LTE (i.e., if a short cyclic prefix (CP) is used), and a control-channel pilot is determined to have the same structure as that of a data part in the 14 OFDM symbols (i.e., if two symbols are used as pilots), 12 OFDM symbols can be used as transmission sequences.

Therefore, the time-domain scrambling or spreading sequence x(n) of FIG. 5 or 8 is set to "12" if the hopping is not applied to the sequence length. Otherwise, if different sub-carrier areas use different sequences by the hopping, the value of x(n) is reduced to "6". If reference symbols are additionally used, the length of a sequence-transmission symbol is reduced by a predetermined length corresponding to the number of the reference symbols.

In order to generate the TTI unit symbol according to the embodiment of FIG. 5 or 8, the spreading or scrambling sequence "c(k)" (See FIG. 5 or 9) is applied to the above-mentioned time-domain sequence including pilots. In this case, the sequence "c(k)" is spread or scrambled on a time axis.

If a control signal to be transmitted has a small amount of signal of about one or two bits (e.g., ACK/NACK signal), a transmission sequence "s(k)" is fixed at a frequency axis, a sequence multiplied by all the parts of a single OFDM symbol is BPSK- or QPSK-modulated, so that the resultant sequence may indicate the ACK/NACK, as shown in FIG. 5.

In order to transmit more information (e.g., CQI, and PMI), the following two methods can be used.

Firstly, as shown in FIG. 5, less number of bits from among control data is QAM-marked and is multiplied in all parts of a single control OFDM symbol, and additional bits may be applied to other control OFDM symbols. Otherwise, control data is directly QAM-modulated on a frequency axis, and the resultant data may be applied to sub-carriers. In this case, the sequence "c(k)" performs the scrambling, or may be a UE specific (i.e., a specific UE) or a cell/node-B specific sequence.

If the hopping is also applied to the above-mentioned case, sequences used in a single slot (i.e., the half of a single sub-frame) may be established differently from those of the remaining slots. In the case of applying the MIMO diversity, the diversity can be applied to the frequency axis and the time axis. In the case of applying the MIMO diversity to the frequency axis, a Space-Frequency Block Coding (SFBC) scheme is applied to the structure of FIG. 8. If the case of applying the MIMO diversity to the time axis, the SFBC scheme may be applied to the structure of FIG. 5. In other words, the block coding may be applied to different transmission sequence locations, so that the block-coding result may be transmitted.

Next, in the case of supporting the non-coherent transmission/reception scheme, a reception end has no need to perform channel estimation, so that additional transmission pilots are not required. However, a preferred embodiment of the present invention considers a collision with a data part, and then provides a method for controlling the OFDM symbol part including the pilots not to be used to transmit a control signal. In this case, as previously stated in the above-mentioned coherent scheme, the time-domain modulation sequence x(n) is reduced by the number of OFDM symbols used for pilot transmission.

In the case of supporting the non-coherent transmission/reception scheme, channel estimation is no longer required so that a method for transmitting a control signal can be classified into an implicit modulation scheme and an explicit modulation scheme.

The implicit modulation method does not transmit a direct control signal, and makes a distinction of the control signal using a sequence combination or index.

The explicit modulation scheme directly transmits a control signal to the sequence, so that it can perform the channel estimation. As a result, it is preferable that a differential modulation scheme may be used as a modulation scheme.

The implicit modulation scheme and the explicit modulation scheme will hereinafter be described in detail.

Firstly, the implicit modulation scheme is advantages to transmit a small amount of information. In other words, a transmission sequence s(k) or s(n) is generally set to "1", and information is generated by combination of a frequency-direction modulation sequence c(k) and a time-direction modulation sequence x(n).

In more detail, if a specific sequence is transmitted on the condition that a predetermined set from among available sequences has been fixed, a reception end performs the mapping of sequence set information corresponding to the control signal, and searches for desired information. In association with the predetermined set, a single UE uses a single sequence (on-off keying) or two sequences (sequence-keying) for one bit.

In this way, only one of "c(k)" and "x(n)" may be selected when the sequence set is configured, and the combination of them "c(k)" and "x(n)" is considered to be a single new sequence so that the combination result may be mapped to a control signal.

For example, if the number of available sequences c(k) is set to "12", and the number of available sequences x(n) is set to "7", a total of 84 sequence combinations (i.e., 12*7) can be used. And, if the slot-unit hopping is performed, sequences at the hopped positions may construct other combinations (i.e., one of the sequences c(k) and x(n), or the combination of the sequences c(k) and x(n)). In other words, if a single UE performs the on-off keying in a single slot, it can extract bit information stored in a first slot and the other bit information stored in a second slot in different ways. Also, one UE may combine sequence transmission information of one slot with those of the other slot, and may detect a signal according to the combined result. For example, in the case of using two sequence combinations A and B, a signal can be transmitted according to four combinations [A,A], [A,B], [B,A], and {B,B}. Therefore, a receiver may detect the above-mentioned two combinations in two slots, convert the detected combinations into a specific bit combination, and analyze the converted result.

The explicit modulation scheme will hereinafter be described in detail. In the case of transmitting a control signal as modulation information, there is needed a method for detecting a data symbol without performing the channel estimation as in the above-mentioned differential modulation, so that the explicit modulation scheme can receive the control signal using the non-coherent scheme.

There are two kinds of differential modulation methods, i.e., a first differential modulation method and a second differential modulation method. The first differential modulation method uses a change of a modulation value (generally a phase difference) between neighboring sub-carriers on a frequency axis as single control signal information. The second differential modulation method uses a change of a modulation value between different OFDM symbols on a time axis as control signal information.

In order to transmit much more information, a two-dimensional (2D) differential modulation scheme can be considered. The 2D differential modulation scheme may perform a differential encoding process for each OFDM symbol on a frequency axis, or may allow each sub-carrier to have differential modulation information among different OFDM symbols on a time axis.

The diversity scheme may also be applied to the non-coherent scheme, so that the Space-Frequency Block Coding (SFBC) or the Space-Time Block Coding (STBC) is applied to a frequency axis or a time axis in the same manner as in the coherent scheme, thus generating a control signal.

Next, a method for combining the coherent scheme with the non-coherent scheme according to one embodiment of the present invention will hereinafter be described.

A control channel structure (e.g., ACK/NACK channel structure) and a transmission/reception technique of the coherent scheme are different from those of the non-coherent scheme according to transmission capability, UE capability, and channel characteristics. In more detail, the coherent scheme supports transmission of a small amount of information composed of one or two bits by converting a modulation technique into another method, so that its UE capability is superior to that of the non-coherent scheme.

However, the coherent scheme is greatly dependent on the channel estimation, so that its channel estimation reliability is lowered in highly-time-varying mobile environments. As a result, the coherent scheme has difficulty in maintaining orthogonality, resulting in deterioration of its performance.

The non-coherent scheme based on the implicit modulation requires allocation of additional sequences whenever each 1-bit transmission is added, so that its UE capability required for transmitting information composed of at least 2 bits is lowered. Needless to say, if the non-coherent scheme discards a slot-unit frequency hopping gain so as to solve the above-mentioned problem, the non-coherent scheme can maintain desired UE capability. However, it should be noted that a diversity gain of the non-coherent scheme is lowered, resulting in the occurrence of performance deterioration. Although a channel variation is relatively large as in a high-speed mobile environment, the non-coherent scheme is superior to the coherent scheme highly dependent on channel estimation.

In this way, in order to maximize the efficiency of transmission of a small amount of control signal, the coherent scheme or the non-coherent scheme can be selectively determined, so that a control channel required for the selected scheme is also required.

According to the present invention, it is assumed that a resource structure for a basic control channel considers the slot-unit hopping shown in FIG. 16, the number of reference signals for each slot is not fixed, and the resource structure is constructed using one RB (i.e., 1 RB) as a basic unit. And, it is assumed that a sequence length of a frequency domain is 12, the resource structure uses 6 sequences by performing the cyclic shift on a CAZAC of a specific index, and the spreading code of a time domain uses a maximum length "7" on the basis of a slot. Needless to say, the present invention may configure a variety of combinations as necessary, for example, a spreading code with the length of 3 and a spreading code with the length of 4 may be configured.

In conclusion, according to the above-mentioned embodiment, the present invention can generate a total of 42 orthogonal channels (i.e., 42=7*6) in one slot, and the coherent or non-coherent scheme requires two orthogonal channels or orthogonal codes to transmit information of 1 bit. 42 codes are grouped into 21 pairs of codes (i.e., 21 code-pairs), these 21 code-pairs are allocated to a UE, and the UE uses the 21 code-pairs, so that the scrambling structure of the coherent and non-coherent schemes can be easily supported.

As previously stated above, the present invention may configure a variety of combinations by division of the time-domain spreading code, so that it can establish a variety of code-pair structures according to channel characteristics and UE capability.

In the meantime, as described above, according to another embodiment, the present invention provides a transmission signal generation method capable of supporting a multi-format or acquiring a variety of spreading gains.

According to the above-mentioned method for generating the transmission-unit symbol in time and frequency domains, the present invention can transmit additional information by modulating transmission information in time and/or frequency directions. Also, the present invention generates a transmission signal by modulation of time and frequency domains, so that it can be applied to a transmission signal generation method capable of supporting a variety of control signal formats.

In the case of generating a control signal using the schemes of FIGS. 5 and 8, if a UE must transmit a control signal (e.g., ACK/NACK signal) using only a predetermined number of bits, the present invention non-coherently detects a corresponding sequence using a sequence combination, uses a predetermined number of symbols from among several transmission signals as a pilot (wherein the number of OFDM symbols to be used as actual pilots must be optimized), and directly corrects a phase of a data symbol.

However, if the number of bits of transmission information is changed in the control channels of FIGS. 5 and 8, flexibility or adaptability may be decreased.

In other words, provided that a maximum number of bits capable of being transmitted within a specific error rate are "10" (i.e., 10 bits) on the condition that a single resource block is configured as a control signal channel, another channel structure must be designed to transmit more bits. However, an unexpected interference may occur between neighboring cells employing different channel structures. In order to remove the interference, the neighboring cells must use the same channel structure. Therefore, although another channel structure is designed, the interference cannot be solved. Therefore, there must be designed an improved structure, which reduces the interference between neighboring cells simultaneously while transmitting a variable amount of information.

Therefore, the present invention provides a transmission signal generation method. The transmission signal generation method maintains the PAPR/CM characteristics of a control signal during the transmission of the control signal, allows each UE to support a variety of control signal formats, and has no problem in a multi-cell operation.

Figure 20:
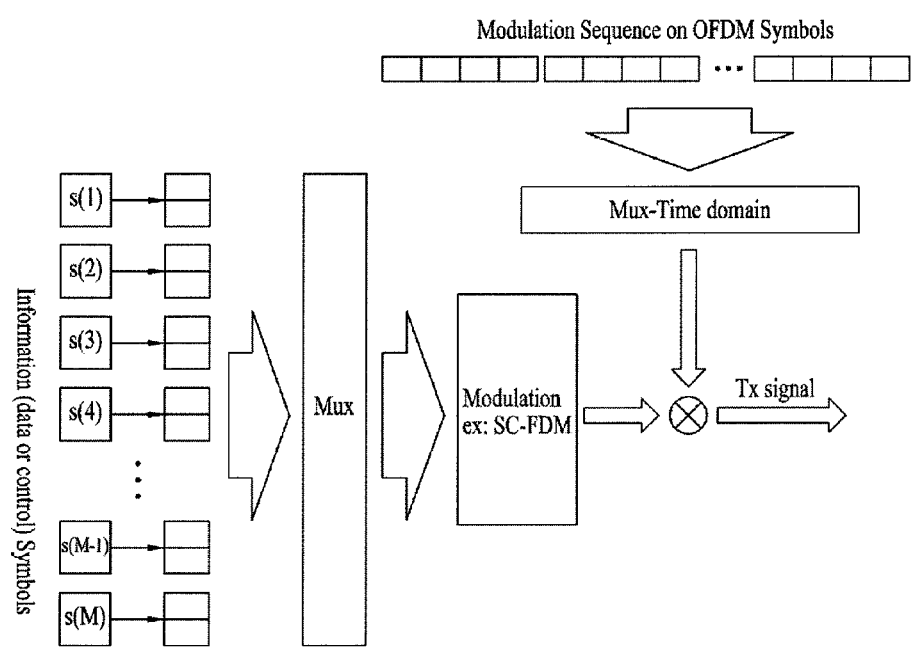
FIG. 20 is a conceptual diagram illustrating a method for spreading an information symbol in symbol units in a frequency domain, performing a modulation process in each domain by multiplexing a time/frequency-domain modulation/masking sequence, and transmitting a transmission (Tx) signal according to the modulated result.

FIG. 20 is a conceptual diagram illustrating a method for spreading an information symbol in symbol units in a frequency domain, performing a modulation process in each domain by multiplexing a time/frequency-domain modulation/masking sequence, and transmitting a transmission (Tx) signal according to the modulated result.

Differently from the methods of FIGS. 5 and 8, the method of FIG. 20 is able to generate a signal capable of being transmitted to a corresponding channel, although the length of the spreading or modulation/masking sequence is set to a total length available in a corresponding channel or is shorter than the total length available in the corresponding channel.

In more detail, the methods of FIGS. 5 and 8 use a sequence capable of using all parts of a maximum length available in a given area of a corresponding channel. In this case, the transmitted control signals have the same robustness (e.g., BER or FER). However, the ACK/NACK signal from among actual control signals requires a very low BER as described above whereas a relatively high BER is allowed in the CQI/PMI information.

In the case of considering the above-mentioned case, the above-mentioned method of FIG. 5 or 8 may not satisfy requirements of different control channel signals.

On the other hand, as shown in FIG. 20, if a requirement of the length of the spreading/modulation sequence relaxes, the present invention can generate a control signal having a variety of requirements according to a Quality of Service (QoS) required for each control signal.

For example, a constant spreading length is applied in symbol units by the spreading of an information symbol (for example, as shown in FIG. 20, a spreading gain is "2"), the resultant symbol is multiplexed in a frequency domain and is then modulated by a specific scheme (e.g., SC-FDM). Thereafter, as shown in FIG. 20, a time-domain sequence (e.g., a time-domain sequence with the length "4") is applied to each symbol unit (e.g., OFDM symbol) modulated in the frequency domain, so that the time-domain modulation can be performed. The time-domain modulation sequence is multiplexed in the time domain as shown in FIG. 20, so that the length of a corresponding sequence may not be limited. In this case, the sequence applied to the information symbol is combined with the other sequence applied to the generated modulation symbol, so that individual UE signals can be distinguished from each other by the combination of the two sequences.

If the used sequences have no problem in scalability (i.e., if a cross-correlation value between a short-length sequence and a long-length sequence is low), the length of each sequence may have different values in the same frequency/time resource area.

Otherwise, if the used sequences have the problem of scalability, it is preferable that they may use the same structure (e.g., the same-length combination) on the same resources.

In this case, a variety of sequences can be available, for example, Walsh, CAZAC, or pseudo-noise (PN) sequences. Preferably, the PN sequence may be adapted to solve the above-mentioned scalability problem. Otherwise, a cross-correlation between used sequences having different lengths is firstly considered, and there may be proposed a method for using only some combinations having no correlation problem even when the sequences having different lengths are mixed with each other (e.g., in the case of using the CAZAC sequence).

In the meantime, according to a modified example of the embodiment of FIG. 8, the length of a spreading sequence applied to each information symbol may have different lengths in the same area.

In FIG. 20, the information-unit spreading of an information symbol in a frequency domain uses a spread sequence with the length of 2. However, if required, the length of the spreading sequence applied to each symbol has no need to always have the same value, and may have different values according to individual information symbols. In this way, the spreading gain is differently established in symbol units, so that each information symbol may have different BER requirements.

Under the condition that the spread sequence applied to each information symbol is configured in the form of a combination of different lengths, if a cross-correlation value between sequences having different lengths is high, users (i.e., UEs) may always use the same combination. Otherwise, if the cross-correlation value between sequences having different lengths is low, users (i.e., UEs) may use different combinations. The above-mentioned two cases can be properly allowed.

Figure 21:
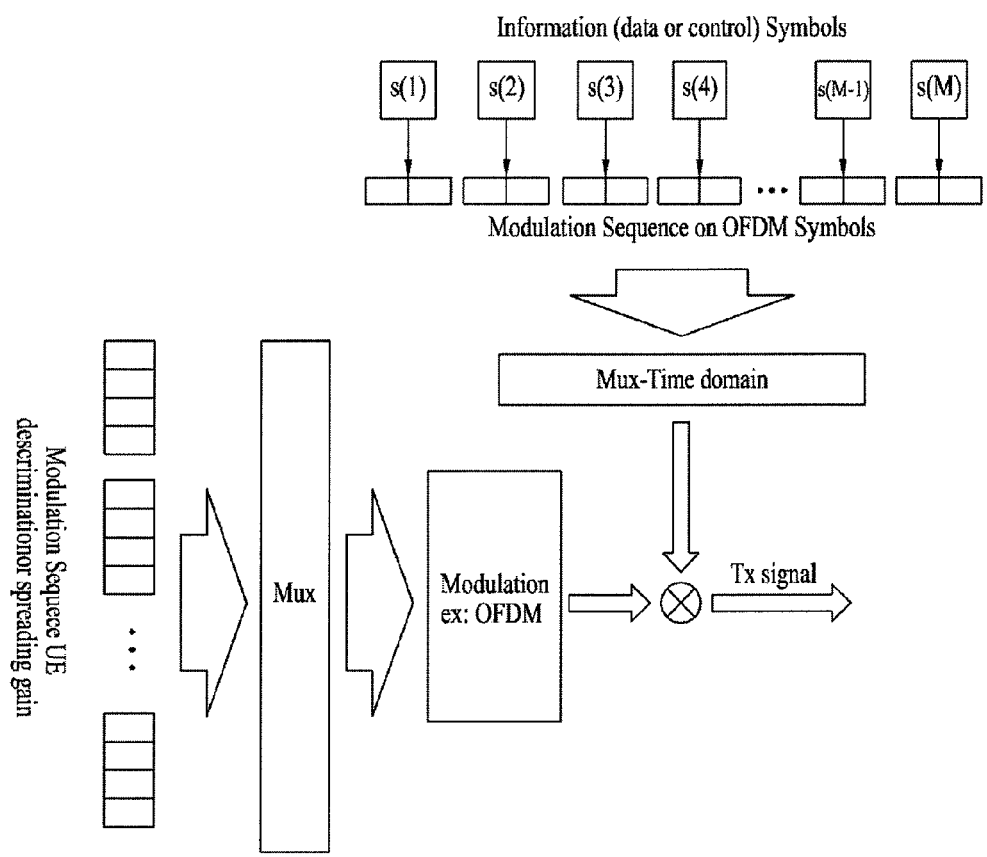
FIG. 21 is a conceptual diagram illustrating a method for spreading an information symbol in symbol units in a time domain, performing a modulation process in each domain by multiplexing a time/frequency-domain modulation/masking sequence, and transmitting a transmission (Tx) signal according to the modulated result.

FIG. 21 is a conceptual diagram illustrating a method for spreading an information symbol in symbol units in a time domain, performing a modulation process in each domain by multiplexing a time/frequency-domain modulation/masking sequence, and transmitting a transmission (Tx) signal according to the modulated result.

The embodiment of FIG. 21 relates to a method for applying an information symbol on a time axis, differently from the above-mentioned embodiment of FIG. 20. In this case, a sequence on the frequency axis (hereinafter referred to as a frequency-axis sequence) is adapted to acquire the spreading gain (i.e., multi-user interference MUI removal). In FIG. 21, the spreading is performed in symbol units before an information symbol is applied on a time axis.

Provided that an actual transmission unit is fixed to a specific time length (e.g., TTI), although an information symbol is applied while the spreading effect is given on a time axis, the amount of information to be transmitted is reduced due to the fixed time length.

On the other hand, although the transmission unit is fixed to the TTI, the embodiment of FIG. 20 can adjust the length for a frequency axis, so that the amount of information to be transmitted is changed. Namely, in order to allow more UEs to transmit more information within the same space, the present invention must increase the amount of resources on the frequency axis.

According to the embodiment of FIG. 21, the amount of information is limited. However, if the embodiment of FIG. 21 increases the frequency-axis length, it can accommodate more UEs therein. The number of supportable UEs is determined according to categories of a used sequence. For example, if only the same root sequence is used in the CAZAC case, a maximum number of supportable UEs are determined by the length of channel delay spread.

In association with FIGS. 20 and 21, although the above-mentioned embodiments have disclosed that information symbols are applied to either the time domain or the frequency domain, there is no need for an application area of the information areas to be fixed at either one of the two domains. Namely, the transmission signal generation method according to the present invention can transmit information symbols to both the frequency domain and the time domain. In this case, the amount of information to be transmitted increases whereas the spreading gain and the number of supportable UEs are decreased. In order to solve the above-mentioned problem, resources are extended to the frequency/time axis to construct a control channel.

Next, a general method for supporting a variety of control channel formats will hereinafter be described.

In order to support a variety of control signal formats, two access schemes (i.e., first and second access schemes) can be used.

The first access scheme sets the same control signal channel structure and adjusts data loaded on this channel structure. In other words, if the amount of loaded information is changed, a code rate is also adjusted to be suitable for the changed amount of loaded information.

The second access scheme defines a control channel structure according to a control channel format, and uses the defined control channel structure. This second access scheme may also be classified into a first method and a second method. The first method allows several UEs to share positions of resources to be re-used by the control channel. The second method defines different resources to transmit a control signal, and uses the defined resources.

Firstly, if the control signal channel having a fixed size is used, a total number of symbols are limited while a modulation symbol entering each "Information Symbol" position of FIGS. 20 and 21 is generated. In more detail, since the number of generated symbols is limited, only a specific control signal format should be used, so that the modulation symbol can be applied to the information symbol positions of FIGS. 20 and 21. Otherwise, although control signal formats of different lengths are used, the number of modulation symbols of a control signal must be fixed at a predetermined value, so that the modulation symbols can be applied to the information symbol positions of FIGS. 20 and 21.

Figure 22:
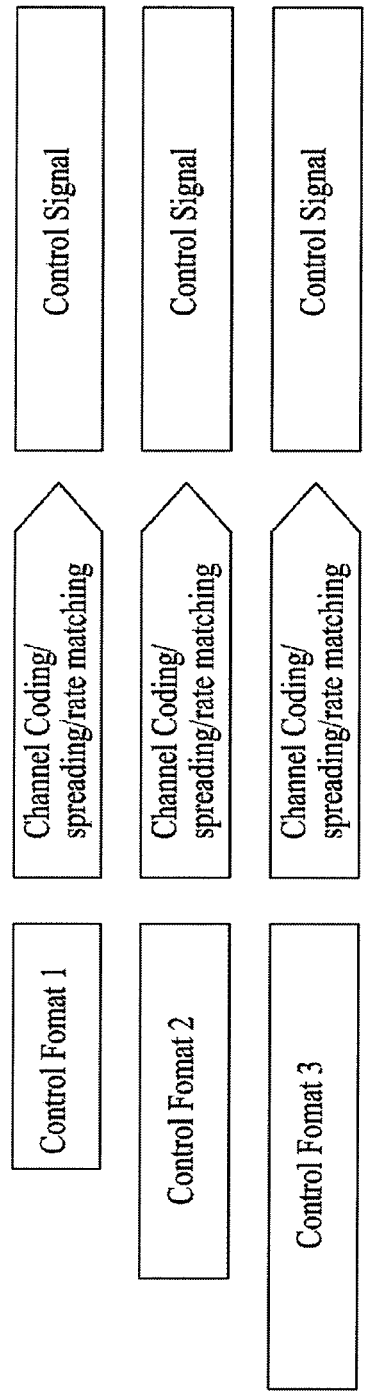
FIG. 22 shows an example for applying control signals of various formats when the size of a control signal channel is fixed according to one embodiment of the present invention.

In order to implement the above-mentioned operations, the channel coding rate may be adjusted as shown in FIG. 22, or the spreading gain may also be adjusted.

FIG. 22 shows an example for applying control signals of various formats when the size of a control signal channel is fixed according to one embodiment of the present invention.

According to the embodiment of FIG. 22, the present invention may apply different coding rates, spreading factors, rate matching operations to control signals of different lengths, so that the control signals can be adjusted to be suitable for a fixed control signal channel size. Therefore, a control signal symbol suitable for a corresponding control signal channel size can be generated. The present invention can use control signals of different formats using the above-mentioned method, and can support different BER/FER performances required for individual control signals.

Next, a method for reconstructing a control signal channel structure according to the uses of the control signal channel structure will hereinafter be described.

As shown in FIGS. 20 and 21, if the control signal channel structure can be reconstructed according to its uses, the number of transmittable information symbols can be adjusted.

For example, if the structure of FIG. 20 transmits individual information symbols without spreading them, as many information symbols as the number of sub-carriers can be transmitted. However, if the spreading factor of each information symbol increases in the order of 2, 3, and 4 . . . , the number of transmittable information symbols is decreased in proportion to the spreading factor.

The technique of FIG. 22 can be adapted to generate an information symbol corresponding to a control channel length. For example, the number of information symbols of an ACK/NACK signal is low (e.g., 1 or 2), and the spreading can be performed for a long period of time, so that high BER/FER requirements can be satisfied. Otherwise, if many information symbols are required as in a CQI/PMI signal, the spreading length is reduced and the number of information symbols increases, so that large amounts of bit information can be transmitted according to the slightly-weakening BER/FER requirement.

The above-mentioned method for generating a control channel by adjusting the spreading gain has an advantage in that it has a length-variable performance via a single structure. However, this method must consider the mixing of different UEs and the influence of interference caused by other cells.

In the case of transmitting a control signal by sharing the same resources, a method for removing an interference between different UE signals or signals of other cells will hereinafter be described.

This embodiment can establish the spreading gain of each symbol, irrespective of categories of the spreading/scrambling sequence associated with the information symbol. In other words, the spreading gain of each symbol is exemplarily set to "2" in FIGS. 20 and 21. If a user or UE desires to adjust the number of transmission information symbols, the spreading gain applied to each symbol can be adjusted. Therefore, the present invention can properly define the number of transmission information symbols using the combination of sequences having different spreading gains for each control signal format, and transmits the defined information symbols.

However, the above-mentioned scheme may unexpectedly generate either the interference between different UEs which transmit signals using the same resources, or the interference between signals of different cells.

Therefore, in order to adjust the spreading gain for each symbol, coordination of sequence use may be required. In other words, the above-mentioned scheme may allocate sequences to be used by different UEs within a specific cell, resulting in the prevention of interference between the UEs. And, even in the neighboring cell, the above-mentioned scheme may perform coordination or randomization so as to prevent the interference between sequences.

One of various methods for the above-mentioned operations is the sequence hopping. However, if sequences of different lengths are applied to the spreading for each symbol as described above, the interference may be intensified. As a result, it is preferable that the number of combinations of the spreading sequences may be set to "1" only.

If required, a method for re-adjusting the information symbol itself may be considered. In other words, the most basic spreading-sequence combination is configured, UEs are discriminated by a combination between sequence- and shift-indexes associated with the configured combination. Preferably, the spreading gain within each UE may be adjusted by changing a current information-symbol generation method to another method.

Figure 23:
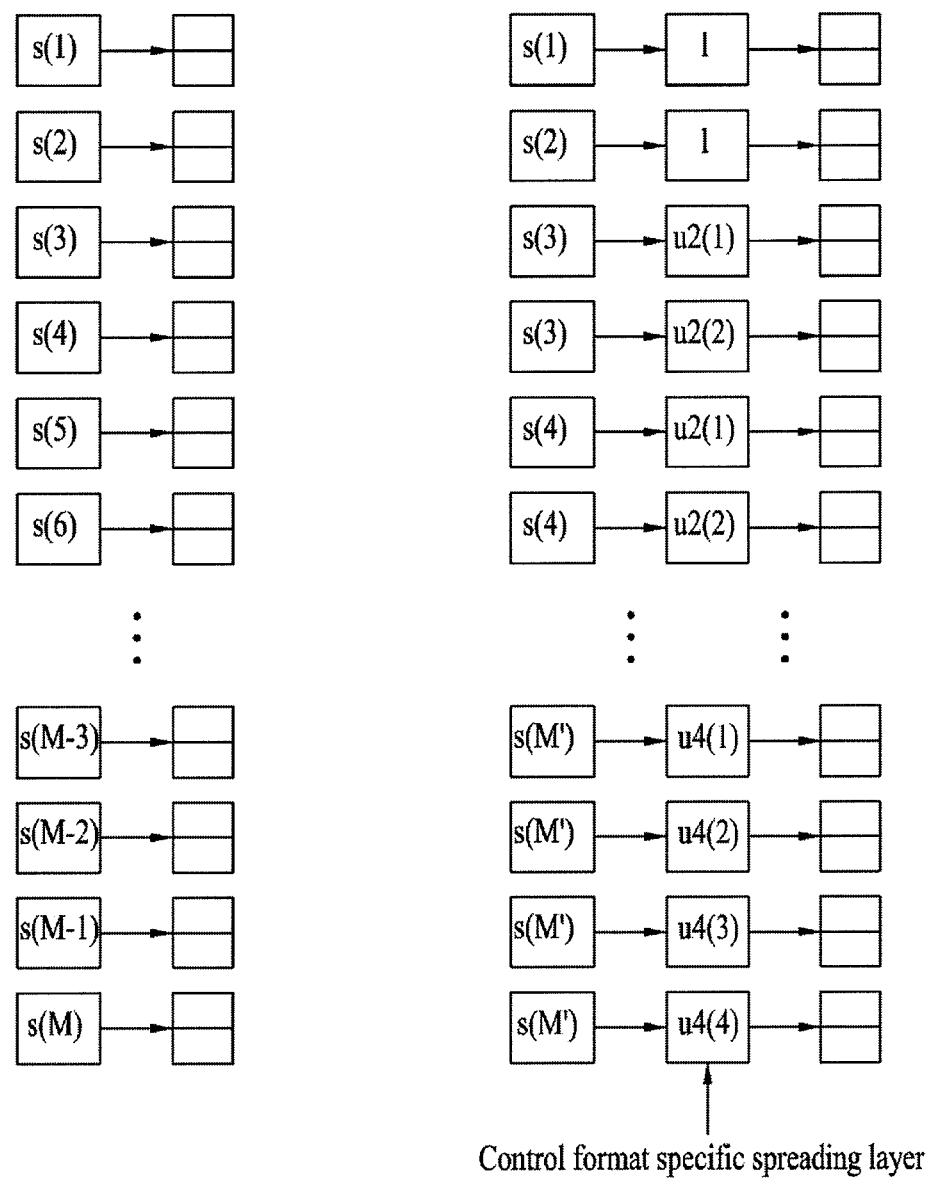
FIG. 23 is a conceptual diagram illustrating a method for defining a spread format based on a control signal format within each UE according to the present invention.

FIG. 23 is a conceptual diagram illustrating a method for defining a spread format based on a control signal format within each UE according to the present invention.

In order to distinguish a first interference between UE from a second interference between neighboring cells, the adjustment between the first and second interferences is required. For this purpose, the use of sequences must be restricted, and a sequence to be used by each UE must be adjusted. In this case, if this part associated with the above-mentioned adjustment is changed, the random-sequence hopping scheme is required for the actual implementation of the present invention. Therefore, in the case of a UE specific sequence combination part, the present invention allows this UE specific sequence combination part to have no variation in connection with the control signal format, and changes only a method for generating the information symbol to another method. A detailed description thereof will hereinafter be described.

In more detail, the left side of FIG. 23 shows that each information symbol of FIG. 20 or 21 is mapped to each spreading sequence, and the right side of FIG. 23 shows that a single control channel specific spreading layer is additionally inserted in the center part of the left-side structure of FIG. 23.

In this way, in the case of adjusting the spreading gain and the number of information symbols using the above-mentioned additional spreading layer, the present invention can discriminate between UE signals without using the UE specific sequence combination, so that it can freely perform the cell planning, adjustment, and hoping operations and can also freely define different control channel formats. Specifically, although resources are extended in the direction of a resource axis (i.e., time/frequency axis) where information symbols are loaded, the present invention can easily provide the scalability about the information symbols. A sequence to be used in the control channel specific layer may be an arbitrary sequence. In order to remove noise or prevent the remaining interference caused by other UEs or other cells, it is preferable that sequences having a superior orthogonal property may be used in the present invention.

Next, a method for defining different resources in a control channel, and transmitting control signals over the control channel according to the present invention will hereinafter be described in detail.

If the number of information symbols for each control signal format is fixed at the same number (i.e., if each control signal format has the same number of information symbols), the information symbols are commonly transmitted to the same resources. Otherwise, an additional area is defined so that this additional area is adapted to transmit the information symbols.

Namely, if it is determined that the number of generated information symbols is changed, the present invention defines another resource area, so that there is no need to consider the interference to be generated between different formats. The interference within a cell or the interference between different cells can be removed by the adjustment process or can be maintained at a low value. However, the present invention must define an additional control channel for a corresponding format, irrespective of the number of UEs used for the above format, so that it has difficulty in effectively using resources.

According to the resource definition for different formats, the present invention may define different resource blocks in predetermined allocation units on a frequency axis (for example, in the case of the 3GPP LTE, 12 sub-carriers are defined as a single resource block (RB), and a sub-carrier is allocated using the defined RB as a basic unit. However, this scheme cannot define effective resources.

On the other hand, in the case of applying the spreading gain or the scrambling using the sequences of FIG. 20 or 21, the present invention prefers to distribute resources according to the sequence-generation facility and property. In more detail, if the CAZAC sequence is used as a basic unit, it is preferable that a basic unit of the spreading/scrambling sequence is set to a prime number. For this operation, in the case of supporting another control signal format by frequency-axis division, the present invention performs a sub-carrier division, so that the number of sub-carriers contained in a specific part, to be used as resources for the control signal, may be set to a prime number according to the sub-carrier division result.

In association with the above-mentioned description, a representative example has been described in Korean Patent Application No. 2007-0032725, filed on 3 Apr. 2007, by the same applicant as the present invention, and entitled "METHOD FOR TRANSMITTING/RECEIVING SIGNAL BASED ON PRIME-NUMBER SEQUENCE", which is hereby incorporated by reference. In the case of this example (hereinafter referred to as the "32725 patent), sub-carriers contained in a predetermined number of resource blocks (RBs) are divided into a predetermined number of channels including prime-number subcarriers, so that a signal is transmitted over the divided channels. Therefore, the above-mentioned example guarantees the number of available sequences, so that a multi-cell structure can be easily configured.

In association with the above-mentioned "32725 patent, another embodiment will hereinafter be described in detail.

Another embodiment of the present invention relates to a method for providing a channel structure to guarantee a maximum of spreading sequences used for supporting a multi-cell environment, and transmitting/receiving a signal via the channel structure. When the SC-FDM is maintained and at the same time a multi-access condition is provided, the control channel structure according to this embodiment can generate a maximum of sequences, which can be distinguished from each other without performance deterioration.

A method for generating a Zadoff-Chu (ZC) sequence serving as a CAZAC sequence can be represented by the above-mentioned equations 1 and 2, as previously stated above.

Provided that the length to be applied to a system employing the CAZAC sequence is set to "L", and "N" of Equation 1 or 2 is equal to "L" (i.e., N=L) irrespective of the L value, the following problem may occur.

For the convenience of description, the CAZAC sequence of the length "L" has the following characteristics. If "L" is not set to a prime number, a generated CAZAC sequence may have a plurality of sequence IDs (i.e., M=1, 2, . . . , L−1), but it should be noted that an unexpected duplicate code may occur in the generated CAZAC sequences. In fact, the number of different codes is less than "L−1". Otherwise, if "L" is set to a prime number, (L−1) different codes (i.e., the number of different codes is "L−1") are generated.

In brief, in the case of using the CAZAC sequence including the ZC sequence, if a sequence length "L" is set to a prime number, the largest number of sequences can be used. Otherwise, if the sequence length "L" is not set to the prime number, the present invention can generate distinctive sequences in association with another value "M", which is disjoint of "L". Therefore, in order to guarantee a sufficient number of sequences, it is preferable that the sequence length may be set to a prime number.

Presently, according to the 3GPP LTE, the control channel shown in FIG. 3 has been adapted to transmit only a control signal other than data. In this case, a basic allocation unit allocated to a signal is called a resource block (RB), and the number of sub-carriers contained in one RB (i.e., 1 RB) is 12, which is not a prime number.

Generally, if the spreading sequence is applied to a frequency domain, the number of available sequences is determined according to the number of used sub-carriers, so that the present invention determines whether a multi-cell environment can be supported. As described above, in order to apply the sequence in units of a resource block (RB) including sub-carriers, the number of which is not a prime number, the present invention may use the following methods.

Firstly, a method for generating a prime-length sequence longer than a required length, truncating the length longer than the required length, and employing the truncated sequence will hereinafter be described.

Figure 24:
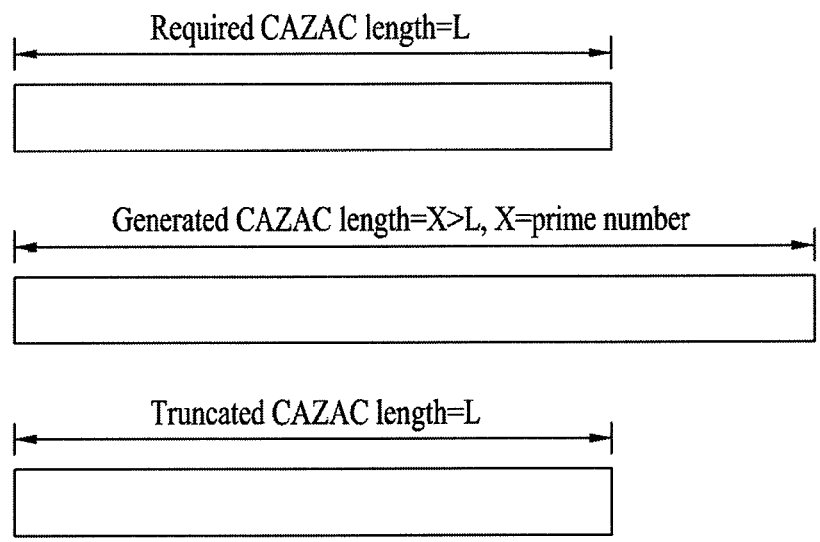
FIG. 24 is a conceptual diagram illustrating a sequence generation method according to a truncated-sequence generation method.

FIG. 24 is a conceptual diagram illustrating a sequence generation method according to a truncated-sequence generation method.

Referring to FIG. 24, if the length required for a system is not a prime number, a prime number "X" higher than "L" is set to "N" of Equation 1 or 2, so that sequences are generated. Thereafter, a sequence longer than "L" from among the generated sequences is truncated to "L".

According to the aforementioned truncated-sequence generation method, the number of sequences can be increased. However, the resultant sequence generated by the above-mentioned method may deteriorate CAZAC-sequence correlation characteristics due to the partial truncation. In fact, if a specific sequence having poor correlation characteristics is removed from the generated sequences, the present invention is confident does not the number of sequences will be always "L−1". And, the generated CAZAC sequences are partially truncated, so that an unexpected deterioration may occur even in the property of a CAZAC sequence having a low PAPR (i.e., a low-PAPR CAZAC sequence).

Secondly, in order to solve the above-mentioned problem, the method of FIG. 24 selects a maximum prime-number length "X", which is equal to or less than the required length "L" of the communication system, generates CAZAC sequences according to the selected result, and inserts a padding part in the part having the length "L-X". For the convenience of description and better understanding of the present invention, the above-mentioned scheme is hereinafter referred to as a padding-type sequence generation scheme.

Figure 25:
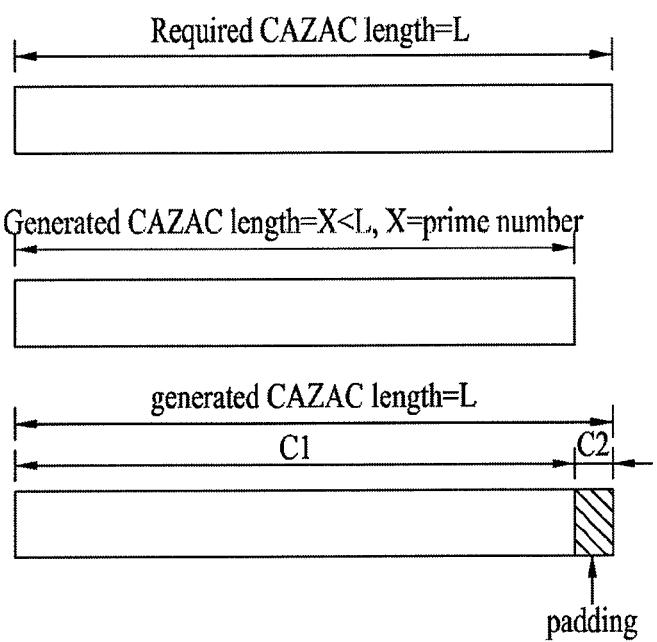
FIG. 25 is a conceptual diagram illustrating a method for generating a sequence according to a padding-sequence generation scheme.

FIG. 25 is a conceptual diagram illustrating a method for generating a sequence according to a padding-sequence generation scheme.

According to the padding-type sequence generation scheme, if the required length "L" of the system is not a prime number, the highest prime number "X" from among several prime numbers, each of which is less than "L", is set to "N" of Equation 1 or 2, and the sequence generation is performed. Thereafter, a part of a predetermined length C2 equal to "L-X" in the generated sequence length C1 is padded with "0", so that the sequence of the length "L" is generated.

In the case of using the above-mentioned padding-type sequence generation method, a correlation part of a corresponding sequence is set to the part "C1" of FIG. 25, and then a sequence distinction is made. As a result, the padding-type sequence generation method may prevent the occurrence of correlation characteristics caused by the sequence truncation. However, the sequence length for use in the above-mentioned padding-type sequence generation method has the part C2 padded with "0", so that correlation and PAPR characteristics may be deteriorated.

Finally, although the required length "L" of the system is not a prime length, the number of distinctively-generated sequences may be very small. However, if the sequence is directly generated with the sequence length to be used, the correlation property between sequences or the signal uniformity (e.g., PAPR, or cubic metric) in time and frequency domains are further improved.

Therefore, the present invention provides a method for establishing a control channel structure advantageous to a guarantee of sufficient sequences, so that it can normally transmit/receive Tx control signals even when no data exists in multi-cell environments. This method is superior to the conventional method in which a sequence generation is adjusted to be suitable for a channel that does not have a prime-number length.

Namely, as described above, in order to improve the CAZAC-sequence characteristics (specifically, ZC-sequence characteristics), the following items must be considered while a control signal channel is generated. Firstly, there is a growing tendency that the number of sub-carriers is equal to the sequence length, so that it is preferable that the number of sub-carriers of a single control signal channel may be a prime number.

In brief, provided that the sequence length is a prime number as in the CAZAC sequence, and a control signal is transmitted using sequences advantageous to a guarantee of sufficient sequences, the present invention divides a corresponding control channel into a predetermined number of channels, each of which includes prime-number sub-carriers (i.e., the number of sub-carriers is a prime number) contained in a predetermined number of RBs. Therefore, the signal transmission method according to the present invention can transmit/receive a corresponding signal using the above-mentioned sequence via the divided channel including the prime-number sub-carriers.

Next, if an uplink of the SC-FDM communication system prescribed in the 3GPP LTE transmits a control signal other than data, a detailed description of the above-mentioned embodiment will hereinafter be described with reference to the control channel structure of FIG. 3. However, it should be noted that a detailed control channel structure and associated signal transmission/reception methods are not limited to only the above-mentioned structure, and can also be applied to other structures, as readily understood by those skilled in the art.

Figure 26:
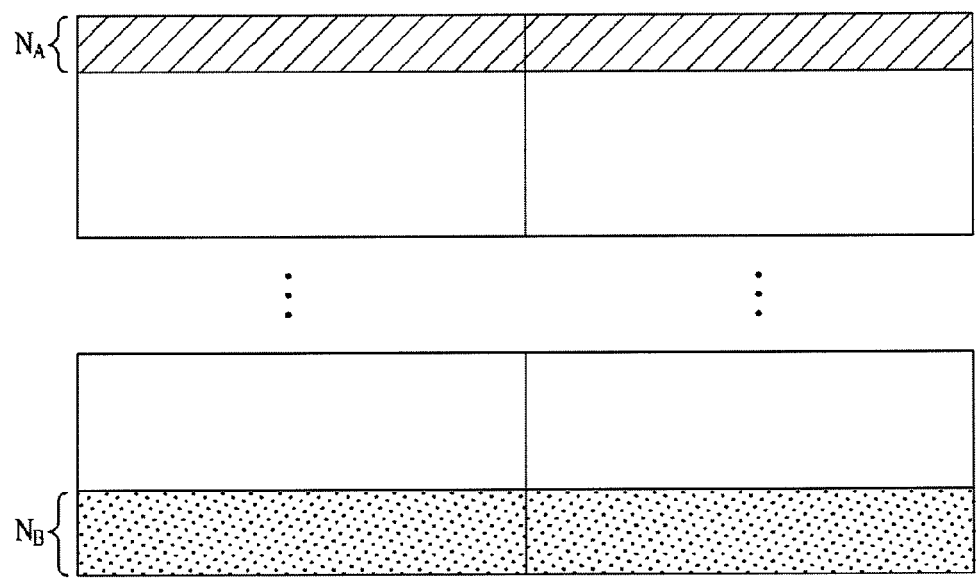
FIG. 26 shows an exemplary structure in which controls channels caused by a resource block division are arranged at both ends of a system bandwidth on a one-to-one basis according to one embodiment of the present invention.

FIG. 26 shows an exemplary structure in which controls channels caused by a resource block division are arranged at both ends of a system bandwidth on a one-to-one basis according to one embodiment of the present invention.

In FIG. 26, it is assumed that one or two physical resource block (PRBs) is allocated to a single physical channel, but it should be noted that three or more PRBs can also be applied to such a control channel without departing from the spirit or scope of the invention.

In more detail, provided that one or two PRBs (i.e., 1 or 2 PRBs) are allocated to the control channel, and 12 sub-carriers are contained in one PRB, these PRBs are divided into two control channels, each of which includes prime-number sub-carriers (i.e., the number of subcarriers is a prime number) of various combinations, and then the resultant control channel is formed as shown in FIG. 26. As can be seen from FIG. 26, the resultant control channel is divided into two parts, and the divided parts are arranged at both ends of the system bandwidth. In this case, the number of sub-carriers contained in one control channel is NA, and the number of sub-carriers contained in the other control channel is NB.

In the meantime, FIG. 26 shows that two divided control channels (hereinafter referred to as two division control channels) shown in Table 1 are arranged at both ends of the system bandwidth, respectively. However, it should be noted that the two division control channels have no need to be distributed to both ends of the system bandwidth.

Figure 27:
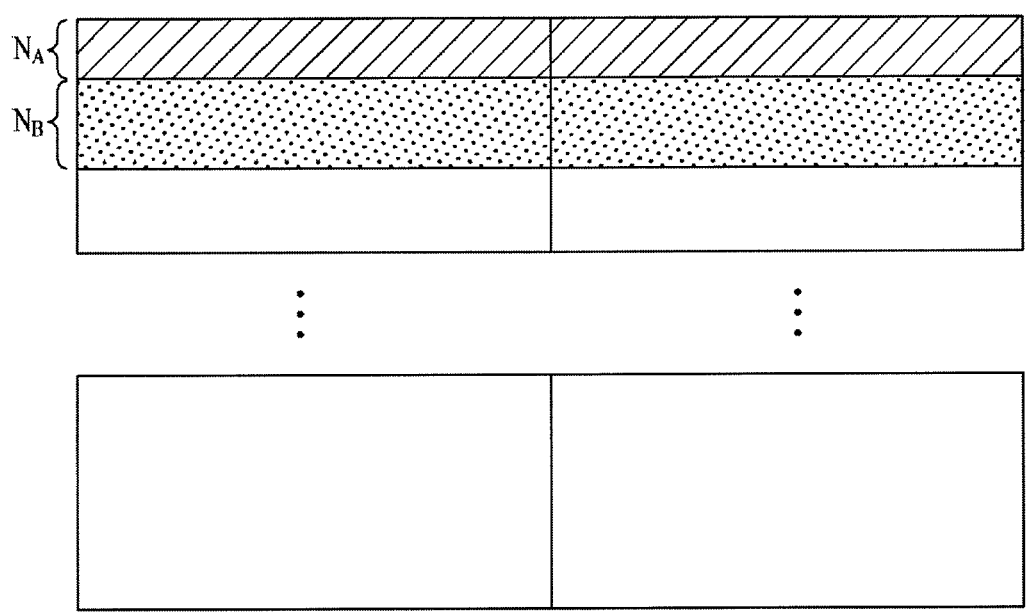
FIG. 27 shows an exemplary structure in which a control channel caused by a resource block division is arranged at one end of a system bandwidth according to one embodiment of the present invention.

FIG. 27 shows an exemplary structure in which a control channel caused by a resource block division is arranged at one end of a system bandwidth according to one embodiment of the present invention.

In FIG. 6, the control channel divided for the number of sub-carriers of the same combination may be arranged at both ends of the system bandwidth. Differently from FIG. 6, in FIG. 27, the control channel may be arranged at only one end of the system bandwidth.

In association with FIGS. 26 and 27, the bandwidth (BW) allocated for the control channel is divided into two control channels, but the number of divided control channels may be determined in various ways according to system requirements.

In the meantime, if PRBs (e.g., some parts of one PRB divided into several blocks) are arranged at both ends of the system bandwidth and are used as a control channel as shown in FIG. 26, or if divided control channels are arranged at one end of the system bandwidth as shown in FIG. 27, a symmetrical problem may occur. In other words, the symmetrical problem indicates that the power is concentrated at only a specific band contained in the system bandwidth.

For this operation, in the case of constructing a control channel, it is more preferable that all PRBs (the number of PRBs is an integer) may be arranged at a transmission area of a control signal.

Figure 28:
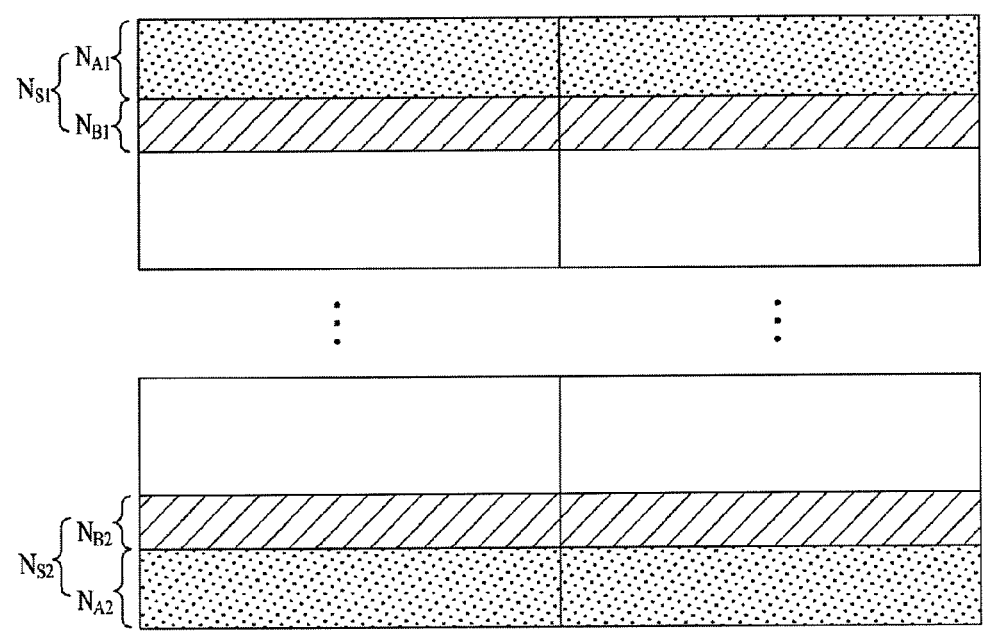
FIG. 28 shows an exemplary structure in which a predetermined number of resource blocks are arranged at both ends of a system bandwidth and a control channel is formed by division of the resource blocks according to one embodiment of the present invention.

FIG. 28 shows an exemplary structure in which a predetermined number of resource blocks are arranged at both ends of a system bandwidth and a control channel is formed by division of the resource blocks according to one embodiment of the present invention.

In FIG. 28, a predetermined number of PRBs (e.g., the number of PRBs is an integer) are arranged at both ends of the system bandwidth, and each PRB is divided into control channels, each of which includes a prime number of sub-carriers. In more detail, Ns1 PRBs (i.e., Ns1 number of PRBs) and Ns2 PRBs (i.e., Ns2 number of PRBs) are arranged at both ends of the system bandwidth, respectively. And, the PRB region (Ns1) is used as a control channel composed of (NA 1, NB1) sub-carriers, and the other PRB region (Ns2) is used as a control channel composed of (NA2, NB2) sub-carriers.

In FIG. 8, the number of PRBs allocated for the control channels located at both ends of the system bandwidth may have the following combinations shown in Table 2:

TABLE 1

| Control Channel BW | $N_A$ | $N_B$ |
|---|---|---|
| 1PRB (12 sub-carriers) | 1 | 11 |
| | 5 | 7 |
| | 7 | 5 |
| | 11 | 1 |
| 2PRBs (24 sub-carriers) | 1 | 23 |
| | 5 | 19 |
| | 7 | 17 |
| | 11 | 13 |
| | 13 | 11 |
| | 17 | 7 |
| | 19 | 5 |
| | 23 | 1 |

| PRB for control channel | Ns1 | Ns2 |
|---|---|---|
| 1 | 1 | 0 |
| | 0 | 1 |
| 2 | 2 | 0 |
| | 1 | 1 |
| | 0 | 2 |
| 3 | 3 | 0 |
| | 2 | 1 |
| | 1 | 2 |
| | 0 | 3 |
| 4 | 4 | 0 |
| | 3 | 1 |
| | 2 | 2 |
| | 1 | 3 |
| | 0 | 4 |

If the number of PRBs allocated for the control channels at both ends of the system bandwidth is determined as shown in Table 2, both system bandwidths of FIG. 28 may be asymmetrical to each other.

For example, the size of one control channel area may be "xPRB", and the size of the other one control area may be "yPRB" (where x≠y). Therefore, the number of sub-carriers allocated to each control channel can be arbitrarily adjusted according to the number of PRBs allocated for the control channel.

The process for generating control channels according to the number of PRBs allocated for a control channel purpose within the system bandwidth can be divided by the scheme of Table 1 according to the number of sub-carriers given to each control channel. Needless to say, if there are a large number of PRBs allocated for the control channel, the PRBs may also be divided into three or more control channels. In this case, the PRB for each control channel is equal to the sum of several prime-length control channels, instead of the sum of two prime-length control channels.

The following Table 3 shows an example in which a predetermined number of PRBs are divided into three control channels.

TABLE 3

| BW for control channel | $N_A$ | $N_B$ | $N_C$ |
|---|---|---|---|
| 1PRB (12 sub-carriers) | 2 | 3 | 7 |
|  | 2 | 5 | 5 |
| 2PRBs (24 sub-carriers) | 2 | 3 | 19 |
|  | 2 | 5 | 17 |
|  | 2 | 11 | 11 |
| 3PRBs (36 sub-carriers) | 2 | 3 | 31 |
|  | 2 | 5 | 29 |
|  | 2 | 11 | 23 |
|  | 2 | 17 | 17 |

The sizes of individual channels generated by Table 3 may be exchanged as necessary. A predetermined number of PRBs allocated for the control channel may also be divided into four or more control channels.

In the meantime, if an actual system is implemented, as shown in FIGS. 26 to 28, the system may not have only one control-channel-purposed PRB in one end of the system bandwidth.

Figure 29:
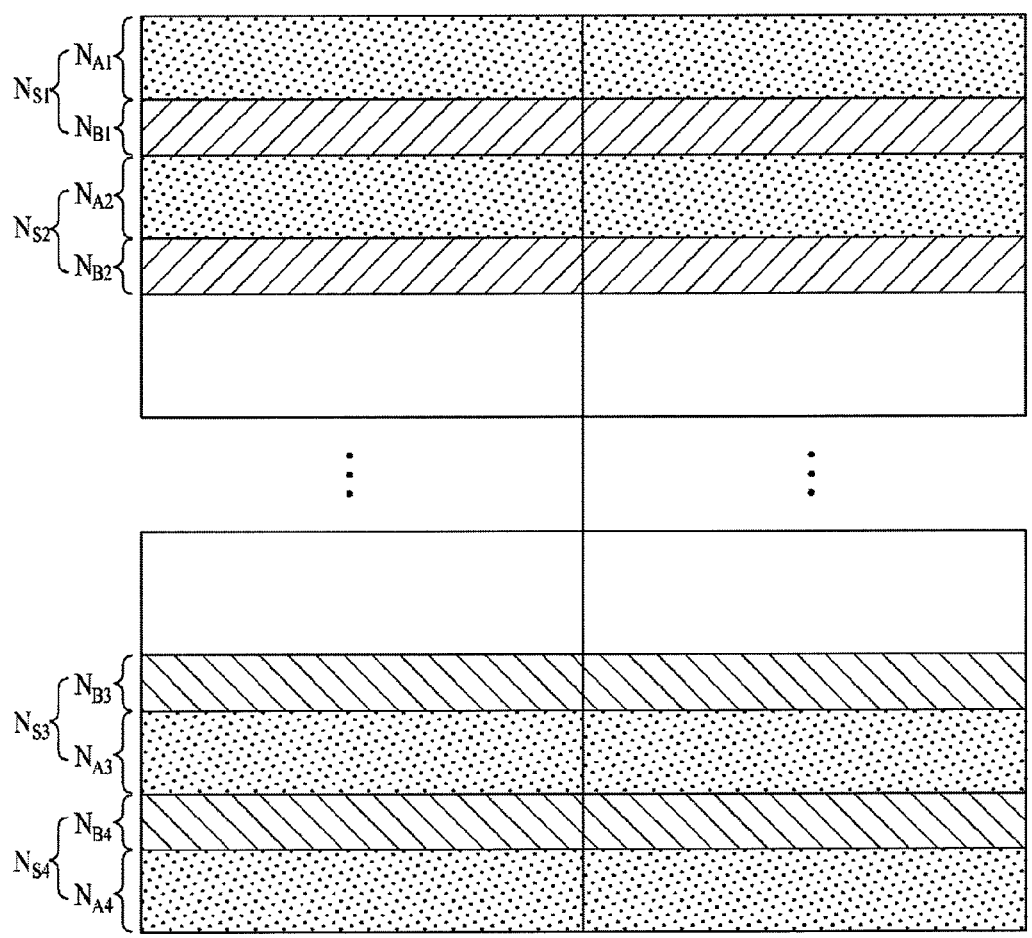
FIG. 29 shows an exemplary structure in which a predetermined number of resource blocks are grouped into several groups at both ends of a system bandwidth, the resultant groups are arranged at the both ends of the system bandwidth, and a control channel is formed by division of the resource blocks according to one embodiment of the present invention.

FIG. 29 shows an exemplary structure in which a predetermined number of resource blocks are grouped into several groups at both ends of a system bandwidth, the resultant groups are arranged at the both ends of the system bandwidth, and a control channel is formed by division of the resource blocks according to one embodiment of the present invention.

Referring to FIG. 29, a control-channel-purposed PRB located at each of both ends of the system bandwidth is composed of only a single control channel group, and may be grouped into a predetermined number of groups in each area. In this case, the control channel having the structure of FIG. 28 repeatedly appears. If the system bandwidth is large, a control signal can be transmitted via an arbitrary part contained in the system bandwidth.

In this way, each PRB group may be divided into a plurality of control channels, each of which includes a prime number of sub-carriers as shown in Tables 1 and 3. FIG. 29 shows that each group is divided into two control channels.

Although the above-mentioned sequence generation/transmission method according to the present invention has been exemplarily applied to the SC-FDM communication scheme, it should be noted that the scope of the present invention is not limited to the SC-FDM communication scheme and can also be applied to the OFDM communication system as necessary.

It should be noted that most terminology disclosed in the present invention is defined in consideration of functions of the present invention, and can be differently determined according to intention of those skilled in the art or usual practices. Therefore, it is preferable that the above-mentioned terminology be understood on the basis of all contents disclosed in the present invention.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

For example, the method for generating/transmitting the transmission-unit symbol according to the present invention can be applied to a control channel for transmitting control information (e.g., ACK/NACK) and a data channel for transmitting information in TTI or slot units.

For another example, the present invention can transmit a control signal via the channel designed by the inventive schemes disclosed in the embodiments. If the channel has a prime-number length, the above-mentioned channel may also be adapted to transmit an arbitrary signal indicating a sequence capable of easily guaranteeing sufficient sequences.

Industrial Applicability

As apparent from the above description, the method for generating/transmitting a sequence based on a transmission unit in time and frequency domains, the embodiments for supporting a variety of formats, and the method for transmitting a signal using a prime-length sequence can be equally applied to not only an uplink of the 3GPP LTE system based on the SC-FDMA scheme, but also a downlink based on a general OFDM scheme.

The present invention can be applied to not only the 3GPP LTE system but also an arbitrary wireless communication system based on the OFDM scheme and/or the FDMA scheme.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for transmitting, by a user equipment, uplink control information in a communication system, the method comprising:
    multiplying a transmission sequence "y(n)" corresponding to the uplink control information by a frequency direction sequence for each symbol "n", that is used for transmission of the uplink control information in a transmission time interval consisting of two slots, to generate an output signal, where "n" is a symbol index; and
    transmitting the output signal in the transmission time interval,
    wherein a length of the frequency direction sequence corresponds to a number of sub-carriers contained in a resource block.

2. The method according to claim 1, wherein the length of the frequency direction sequence is 12.

3. The method according to claim 1, wherein the frequency direction sequence is set to be different in the two slots.

4. The method according to claim 1, wherein the uplink control information is transmitted via different frequency bands in the two slots, and the different frequency bands are opposite frequency bands based on a center of a system bandwidth.

5. The method according to claim 1, wherein each symbol "n" that is used for the transmission of the uplink control information is other than symbols that are used for a pilot.

6. The method according to claim 5, wherein the symbols that are used for the pilot are second and sixth symbols in each of the two slots in the transmission time interval.

7. The method according to claim 5, further comprising: applying the frequency direction sequence to the symbols that are used for the pilot.

8. The method according to claim 1, wherein the transmission sequence "y(n)" is obtained by applying a scrambling sequence to the uplink control information.

9. A user equipment for transmitting uplink control information in a communication system, the user equipment comprising:
a controller configured to control the user equipment to multiply a transmission sequence "y(n)" corresponding to the uplink control information by a frequency direction sequence for each symbol "n", that is used for transmission of the uplink control information in a transmission time interval consisting of two slots, to generate an output signal where "n" is a symbol index; and
a transmitter configured to transmit the output signal in the transmission time interval,
wherein a length of the frequency direction sequence corresponds to a number of sub-carriers contained in a resource block.

10. The user equipment according to claim 9, wherein the length of the frequency direction sequence is 12.

11. The user equipment according to claim 9, wherein the frequency direction sequence is set to be different in the two slots.

12. The user equipment according to claim 9, wherein the uplink control information is transmitted via different frequency bands in the two slots, and the different frequency bands are opposite frequency bands based on a center of a system bandwidth.

13. The user equipment according to claim 9, wherein each symbol "n" that is used for the transmission of the uplink control information is other than symbols that are used for a pilot.

14. The user equipment according to claim 13, wherein the symbols that are used for the pilot are second and sixth symbols in each of the two slots in the transmission time interval.

15. The user equipment according to claim 13, wherein the frequency direction sequence is applied to the symbols that are used for the pilot.

16. The user equipment according to claim 9, wherein the transmission sequence "y(n)" is obtained by applying a scrambling sequence to the uplink control information.

* * * * *